US012291421B2

(12) United States Patent
Ishihara et al.

(10) Patent No.: US 12,291,421 B2
(45) Date of Patent: May 6, 2025

(54) IMAGE FORMING APPARATUS AND CONTROL PROGRAM

(71) Applicant: KONICA MINOLTA, INC., Tokyo (JP)

(72) Inventors: Yasuhiro Ishihara, Toyohashi (JP); Toshikazu Higashi, Toyokawa (JP); Masahiro Kamiya, Toyohashi (JP); Shigetaka Kato, Shinshiro (JP); Katsuhide Sakai, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 178 days.

(21) Appl. No.: 17/808,729

(22) Filed: Jun. 24, 2022

(65) Prior Publication Data

US 2023/0009567 A1 Jan. 12, 2023

(30) Foreign Application Priority Data

Jul. 12, 2021 (JP) ................................. 2021-114754

(51) Int. Cl.
*B65H 7/02* (2006.01)
*B65H 7/14* (2006.01)
(Continued)

(52) U.S. Cl.
CPC ................. *B65H 7/02* (2013.01); *B65H 7/14* (2013.01); *B65H 7/20* (2013.01); *G03G 15/5029* (2013.01);
(Continued)

(58) Field of Classification Search
CPC ... B65H 7/00; B65H 7/02; B65H 7/14; B65H 7/20; B65H 2511/13; B65H 2511/411;
(Continued)

(56) References Cited

U.S. PATENT DOCUMENTS 11,880,153 B2 * 1/2024 Kamiya ............... G03G 15/502
2011/0291353 A1 * 12/2011 Fujiwara ................ B65H 9/006
271/265.01
(Continued)

FOREIGN PATENT DOCUMENTS

CN 102566354 A 7/2012
JP 2006-151612 A 6/2006
(Continued)

OTHER PUBLICATIONS

Merriam-Webster Dictionary, p. 1 (Year: 2024).*

*Primary Examiner* — Prasad V Gokhale
(74) *Attorney, Agent, or Firm* — BakerHostetler

(57) ABSTRACT

An image forming apparatus includes: a sheet feeding conveyor that feeds and conveys a recording medium to a conveyance path; an image former that performs image formation on the recording medium; a medium sensor that is disposed on an upstream side of the recording medium from the image former on the conveyance path and measures one or more sheet physical properties regarding the recording medium conveyed; a first hardware processor that determines a type of the recording medium on a basis of the sheet physical properties measured by the medium sensor; a second hardware processor that determines conveyance performance for the recording medium; and a third hardware processor that determines whether or not to perform the image formation on a basis of the conveyance performance in a case where the type of the recording medium determined by the first hardware processor is a type out of product specifications.

13 Claims, 15 Drawing Sheets

(51) Int. Cl.
*B65H 7/20* (2006.01)
*G03G 15/00* (2006.01)

(52) U.S. Cl.
CPC .... *B65H 2511/416* (2013.01); *B65H 2513/10* (2013.01); *B65H 2553/41* (2013.01); *B65H 2557/64* (2013.01); *B65H 2601/11* (2013.01); *B65H 2701/1916* (2013.01); *B65H 2801/06* (2013.01)

(58) Field of Classification Search
CPC ........ B65H 2511/416; B65H 2511/528; B65H 2513/10; B65H 2515/10; B65H 2515/12; B65H 2553/41; B65H 2557/64; B65H 2601/11; B65H 2601/255; B65H 2801/06; G03G 15/5029
See application file for complete search history.

(56) References Cited

U.S. PATENT DOCUMENTS

| | | | | |
|---|---|---|---|---|
| 2015/0273900 | A1* | 10/2015 | Shinagawa | B41J 13/0054 347/16 |
| 2018/0275590 | A1 | 9/2018 | Nemoto | |
| 2020/0192263 | A1* | 6/2020 | Doda | G03G 21/10 |
| 2021/0302893 | A1* | 9/2021 | Kojima | G03G 15/6594 |
| 2021/0405565 | A1* | 12/2021 | Nonoyama | G03G 15/6594 |
| 2022/0019163 | A1* | 1/2022 | Kurata | G03G 15/2028 |

FOREIGN PATENT DOCUMENTS

| | | | |
|---|---|---|---|
| JP | 2013-076964 | A | 4/2013 |
| JP | 2013-231910 | A | 11/2013 |
| JP | 2013231910 | | 11/2013 |
| JP | 2018-069606 | A | 5/2018 |
| JP | 2018-158791 | A | 10/2018 |
| JP | 2019-184812 | A | 10/2019 |
| JP | 2020-016752 | A | 1/2020 |
| JP | 2021-059451 | A | 4/2021 |
| JP | 2021059451 | | 4/2021 |

* cited by examiner

FIG. 9

| EVALUATION INDEX | DETERMINATION THRESHOLD | DETERMINATION THRESHOLD |
|---|---|---|
| SHEET ARRIVAL DELAY TIME td (CONVEYANCE TIME tx − STANDARD TIME ts) | WITHIN PREDETERMINED VALUE x1 | SATISFACTORY |
| | EXCEED PREDETERMINED VALUE x1 | UNSATISFACTORY |
| TORQUE MARGIN Tm (LIMIT VALUE Tl − DRIVE TORQUE VALUE Tx) | GREATER THAN OR EQUAL TO PREDETERMINED VALUE y1 | SATISFACTORY |
| | LESS THAN PREDETERMINED VALUE y1 | UNSATISFACTORY |

FIG. 10

| | IMAGE FORMING CONDITION | |
|---|---|---|
| DELAY TIME td | CONVEYANCE SPEED | FIXING CONTROL TEMPERATURE |
| LESS THAN OR EQUAL TO PREDETERMINED VALUE x0 | STANDARD SPEED vs × 0.50 | HIGH TEMPERATURE 1 |
| EXCEED PREDETERMINED VALUE x0 TO LESS THAN OR EQUAL TO x1 | STANDARD SPEED vs × 0.25 | HIGH TEMPERATURE 1 |
| EXCEED PREDETERMINED VALUE x1 | NONE (NON-PERMISSION) | NONE (NON-PERMISSION) |

*: x1 > x0

FIG. 12A

| DETERMINATION CONDITION | | | |
|---|---|---|---|
| TYPE OF SHEET | CONVEYANCE PERFORMANCE | DOCUMENT TYPE | IMAGE FORMING CONDITION |
| WITHIN PRODUCT SPECIFICATIONS | PERFORM NORMAL IMAGE FORMATION | | |
| OUT OF PRODUCT SPECIFICATIONS | SATISFACTORY | TYPE 2 | CONDITION 1 |
| | | TYPE 1 | CONDITION 2 |
| | UNSATISFACTORY | – | NON-PERMISSION |

FIG. 12B

| ITEM | TYPE 1 (IMAGE IMPORTANCE IS HIGH) | TYPE 2 |
|---|---|---|
| COLOR MODE | FULL COLOR | MONOCHROME |
| IMAGE | GRAPHICS | TEXT (NO GRAPHICS) |

FIG. 12C

| IMAGE FORMING CONDITION | CONVEYANCE SPEED | FIXING TEMPERATURE |
|---|---|---|
| NORMAL (PLAIN SHEET, STANDARD BASIS WEIGHT) | STANDARD SPEED | STANDARD TEMPERATURE |
| CONDITION 1 | LOW SPEED 1 | HIGH TEMPERATURE 1 |
| CONDITION 2 | LOW SPEED 2 | HIGH TEMPERATURE 1 |
| CONDITION 3 | LOW SPEED 3 | HIGH TEMPERATURE 1 |
| ...... | ...... | ...... |

*: STANDARD SPEED > LOW SPEED 1 > LOW SPEED 2 > LOW SPEED 3 (SLOW (LOOSE))

FIG. 14A

| SHEET TYPE | CLASSIFICATION | BASIS WEIGHT ($g/m^2$) | NUMBER OF TIMES OF JAM OCCURRENCE |
|---|---|---|---|
| OUT-OF-PRODUCT-SPECIFICATIONS SHEET TYPE 01 | PLAIN SHEET | 350 | 0 |
| OUT-OF-PRODUCT-SPECIFICATIONS SHEET TYPE 02 | ENVELOPE | – | N1 |
| OUT-OF-PRODUCT-SPECIFICATIONS SHEET TYPE 03 | COATED SHEET | – | **** |
| ...... | ...... | ...... | ...... |

FIG. 14B

| NUMBER OF TIMES OF JAM OCCURRENCE | IMAGE FORMING CONDITION |
|---|---|
| 0 | PERMISSION |
| ONCE | PERMISSION |
| ...... | ... |
| N1-TH TIME | NON-PERMISSION |

FIG. 16A

| SHEET TYPE | CLASSIFICATION | BASIS WEIGHT ($g/m^2$) | NUMBER OF TIMES OF JAM OCCURRENCE | IMAGE FORMING CONDITION |
|---|---|---|---|---|
| OUT-OF-PRODUCT-SPECIFICATIONS SHEET TYPE 01 | PLAIN SHEET | 350 | 1 | CONDITION 2 |

FIG. 16B

| NUMBER OF TIMES OF JAM OCCURRENCE | IMAGE FORMING CONDITION |
|---|---|
| ZERO TIMES | CONDITION 1 |
| ONCE | CONDITION 2 |
| TWICE | CONDITION 3 |
| ...... | ... |
| N1-TH TIME | NON-PERMISSION |

IMAGE FORMING APPARATUS AND CONTROL PROGRAM

This application claims priority to Japanese patent Application No. 2021-114754, filed on Jul. 12, 2021, the entire disclosure of which is incorporated herein by reference in its entirety.

BACKGROUND

Technological Field

The present disclosure relates to an image forming apparatus and a control to program.

Description of the Related Art

In recent years, image forming apparatuses such as electrophotographic printers have been widely used in the color printing industry. In the field of production printing (PP) corresponding to the color printing industry, adaptation to various sheets is required as compared with a case of being used in an office.

To perform high quality printing on these various sheets, there is a technique of setting a type of sheet stored in a sheet feeding tray and performing printing under an image forming condition determined depending on the setting. For example, in an image forming apparatus disclosed in JP 2021-59451 A, a sensor called a medium sensor that automatically discriminates the type of sheet is disposed on a conveyance path, the type of sheet is automatically discriminated by the detection output, and printing is performed under a printing condition depending on the type.

In general, in an image forming apparatus, a sheet that can guarantee a certain output quality is a sheet within product specifications, and a user selects a type of sheet from a setting range within the product specifications, and printing is performed under an image forming condition corresponding to the selected type of sheet.

On the other hand, as a way of using the image forming apparatus, there is a case where printing is performed using a sheet out of product specifications. The sheet out of the product specifications, for example, a sheet having a basis weight of 350 $g/m^2$ as the type of sheet, is out of the product specifications in many image forming apparatuses, but there are users who print using such a sheet having a large basis weight (thick sheet).

There is a possibility that fixing of toner is insufficient in the case of a sheet with a thickness out of product specifications (thick sheet) or in the case of a sheet in a surface processed state out of the product specifications, and thus in JP 2013-231910 A, an image forming apparatus is disclosed that sets an upper limit in terms of time or the number of sheets for such a sheet out of the product specifications, and executes printing under an image forming condition exceeding the upper limit of normal fixing temperature setting as long as the condition is within a range of the limit.

However, in the first place, there is some risk in using a sheet out of product specifications. For example, there is a risk of image quality degradation and a risk of occurrence of a defect such as a jam. A user who is familiar with the image forming apparatus, such as an operator of a print shop, can perform optimum setting in which the risk and the quality are balanced, while knowing these risks, and can use the optimum setting while minimizing the risk. However, it is difficult to request not only such a user who is familiar with the image forming apparatus but also all users to take similar measures. In addition, there are many cases where a defect occurs due to a wrong specification without recognizing that a sheet out of the product specifications is used in the first place.

Furthermore, it is possible to automatically discriminate that the sheet is out of the product specifications by using a medium sensor in the apparatus as disclosed in JP 2013-231910 A; however, in such a case, processing is performed of uniformly prohibiting printing of the sheet out of the product specifications, and there is a problem that user's options are limited and convenience is impaired.

SUMMARY

The present disclosure has been made in view of the above circumstances, and an object of the present disclosure is to provide an image forming apparatus and a control program capable of automatically performing image formation depending on conveyance performance even in a case where a recording medium out of product specifications is used.

To achieve the abovementioned object, according to an aspect of the present disclosure, an image forming apparatus reflecting one aspect of the present disclosure comprises a sheet feeding conveyor that feeds and conveys a recording medium to a conveyance path; an image former that performs image formation on the recording medium conveyed on the conveyance path; a medium sensor that is disposed on an upstream side in a conveyance direction of the recording medium from the image former on the conveyance path and measures one or more sheet physical properties regarding the recording medium conveyed; a first hardware processor that determines a type of the recording medium on a basis of the sheet physical properties measured by the medium sensor; a second hardware processor that determines conveyance performance for the recording medium conveyed on the conveyance path; and a third hardware processor that determines whether or not to perform the image formation on a basis of the conveyance performance determined by the second hardware processor in a case where the type of the recording medium determined by the first hardware processor is a type out of product specifications.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure:

FIG. 9 is a table indicating the evaluation indexes and determination thresholds;

FIG. 10 is a control table indicating a relationship between the conveyance performance and image forming conditions;

FIGS. 12A to 12C are diagrams for explaining image forming conditions depending on determination of document types in a second embodiment;

FIGS. 14A and 14B are diagrams for explaining determination of permission and non-permission of image formation depending on a jam occurrence history;

FIGS. 16A and 16B are diagrams for explaining an image forming condition depending on a jam occurrence history.

DETAILED DESCRIPTION OF EMBODIMENTS

Figure 1:
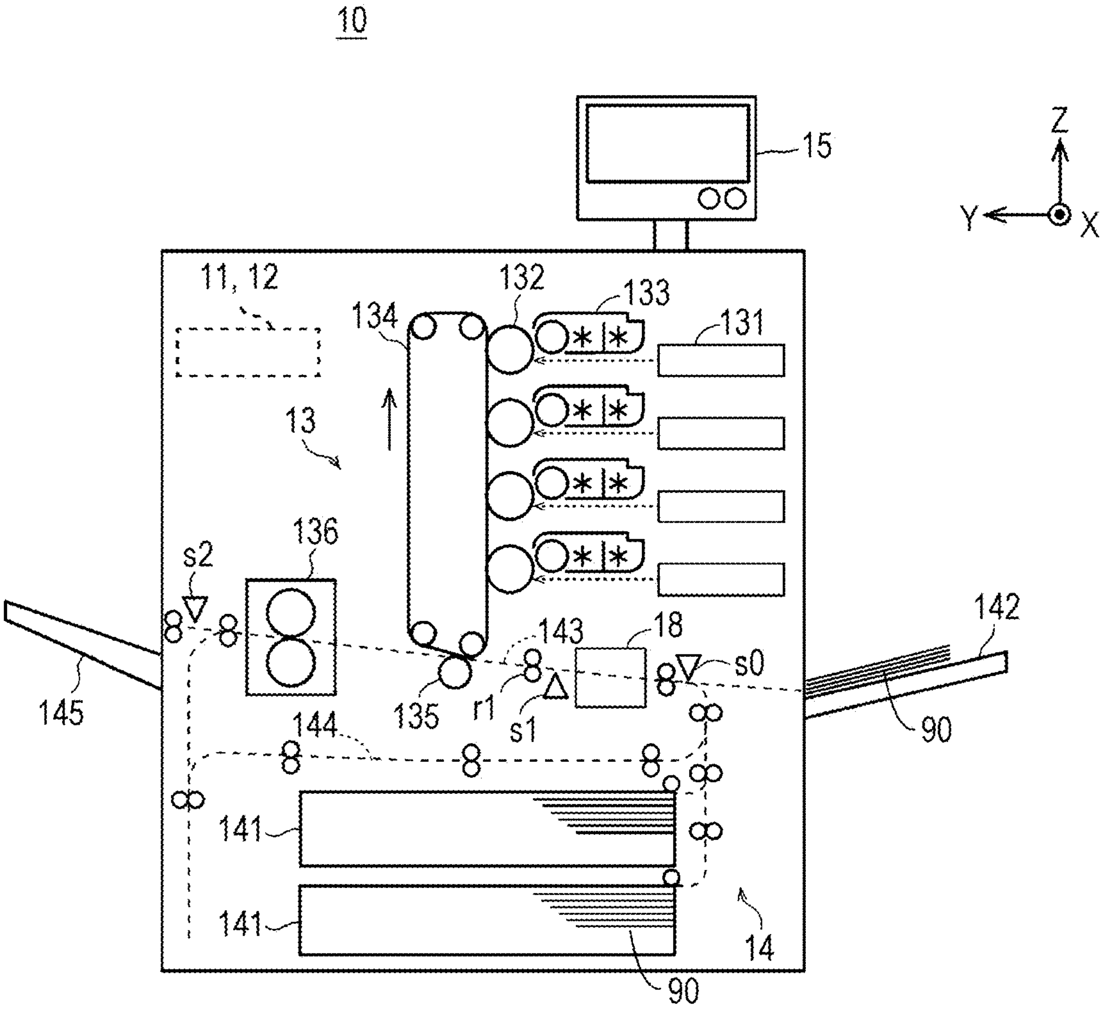
FIG. 1 is a diagram illustrating a schematic configuration of an image forming apparatus according to a present embodiment.

Hereinafter, one or more embodiments of the present disclosure will be described with reference to the drawings. However, the scope of the disclosure is not limited to the disclosed embodiments. Note that, in the description of the drawings, the same elements are denoted by the same reference numerals, and duplicate descriptions will not be provided. Furthermore, dimensional ratios of the drawings are exaggerated for convenience of description and may be different from actual ratios. In the drawings, a vertical direction is a Z direction, a front surface, back surface direction of an image forming apparatus is an X direction, and a direction orthogonal to the X and Z directions is a Y direction. The X direction is also referred to as a width direction. In addition, in a periphery of a medium sensor (a medium sensor 18 to be described later), a conveyance direction of a recording medium that is parallel to a surface of a conveyance path (a conveyance path 143 to be described later) inclined with respect to a horizontal plane and is orthogonal to the X direction is referred to as a Y' direction, and a direction orthogonal thereto is referred to as a Z' direction (see FIGS. 3, 4, etc.). Furthermore, an XY' plane is a plane parallel to a conveyance plane, and Z' is a direction perpendicular to the conveyance plane. In the present embodiment, the recording medium includes a printing sheet and various films. In particular, the printing sheet includes a sheet produced using plant-derived mechanical pulp and/or chemical pulp. In addition, types of the recording medium includes a gloss sheet, a matte sheet, a plain sheet, a high gloss sheet, a coated sheet, an envelope, and the like. Hereinafter, the recording medium is also simply referred to as "sheet". Furthermore, in the present embodiment, the types of the sheet (types of the recording medium) include basis weight (or basis weight category) in addition to classification of sheets such as the gloss sheet, the matte sheet, the plain sheet, the high gloss sheet, the coated sheet, and the envelope.

Figure 2:
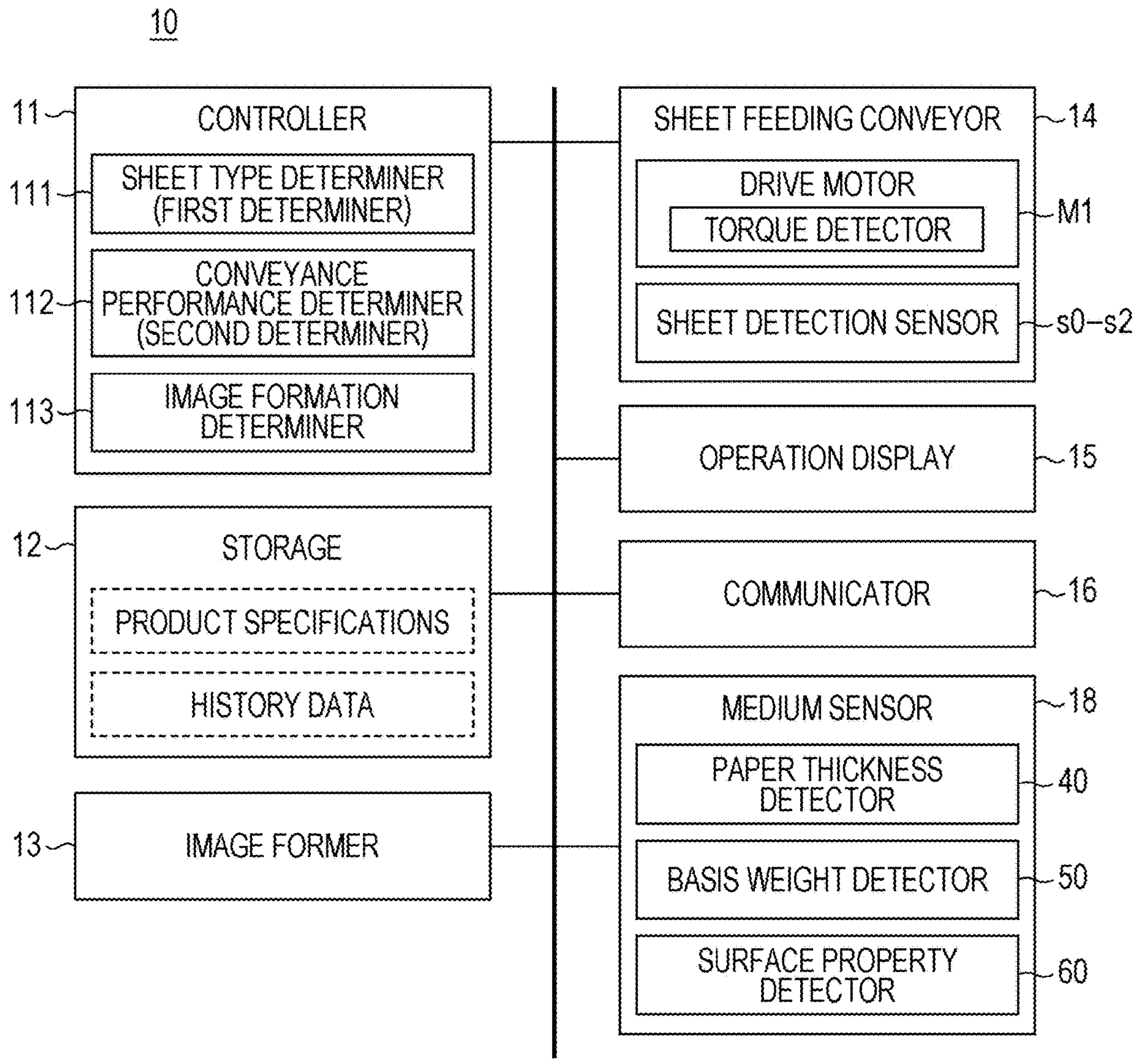
FIG. 2 is a block diagram illustrating a schematic configuration of the image forming apparatus.
Figure 3:
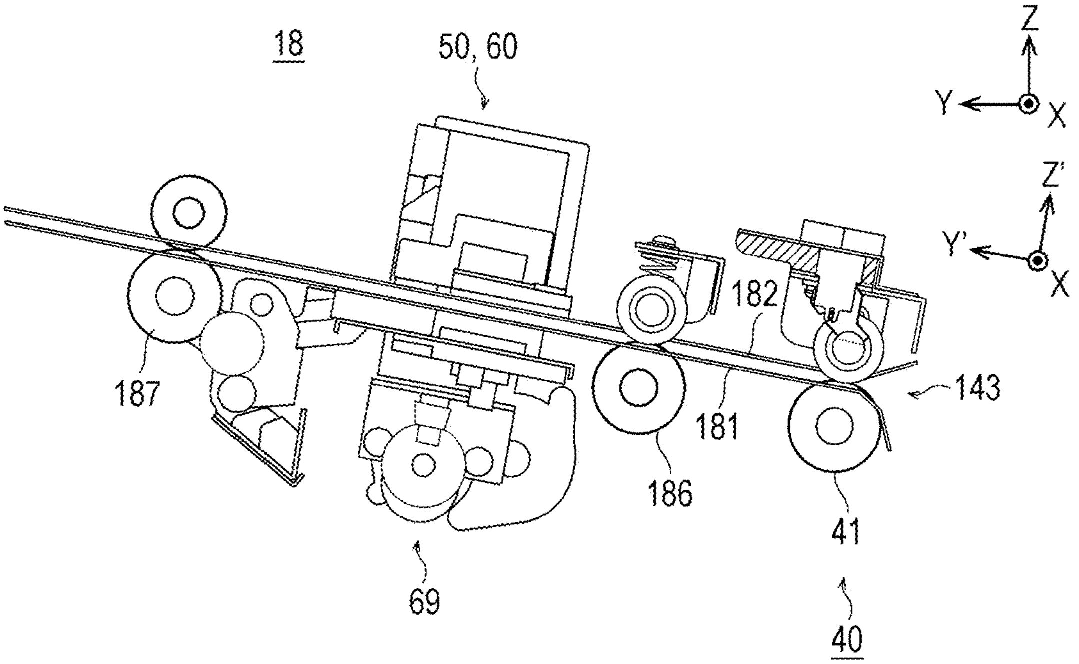
FIG. 3 is a side view of a periphery of a medium sensor disposed on a conveyance path in the apparatus.

FIG. 1 is a diagram illustrating a schematic configuration of an image forming apparatus 10 including the medium sensor 18 in the apparatus. FIG. 2 is a block diagram illustrating a schematic configuration of the image forming apparatus 10. FIG. 3 is a side view illustrating a configuration of the medium sensor 18 disposed on the conveyance path 143.

Image Forming Apparatus 10

Referring to FIGS. 1 and 2, the image forming apparatus 10 includes a controller 11, a storage 12, an image former 13, a sheet feeding conveyor 14, an operation display 15, a communicator 16, a medium sensor 18, and the like. These are connected to each other via a signal line such as a bus for exchanging signals.

Controller 11

The controller 11 includes a CPU, a ROM, a RAM, and the like, executes various types of processing by executing a program stored in the ROM or the storage 12 to be described later, and performs control of each unit of the apparatus and various types of arithmetic processing in accordance with the program. The controller 11 functions as a sheet type determiner 111 that is a first determiner, a conveyance performance determiner 112 that is a second determiner, and an image formation determiner 113. These functions will be described later.

Storage 12

The storage 12 includes an auxiliary storage such as a hard disk that stores various programs and various data in advance. In addition, the storage 12 stores product specifications related to a sheet 90 that can be used and history data related to conveyance of the sheet. Furthermore, the storage 12 may store a learned model and a paper profile used for determination of the sheet type. The learned model and the paper profile are used for sheet type determination processing. Here, the "paper profile" is obtained by registering in advance a measurement value by the medium sensor 18 and characteristic data a sheet size, an arbitrary identification name (for example, a sheet brand), and the like input from a user in association with each other, regarding a certain sheet. The "sheet type discrimination engine" is also referred to as a learned model, and is a learned model generated by supervised learning using teacher data, with an output of detection of the sheet 90 by the medium sensor 18 as an input value and sheet type information set by the user of the sheet 90 as a correct answer label. As the teacher data, data may be used obtained by aggregating data of a plurality of image forming apparatuses connected to a network by a cloud server. A learning machine (not illustrated) can generate a learned model by a learning method using a neural network including a combination of perceptrons. Note that the learning method is not limited to this, and various methods can be adopted as long as it is supervised learning. For example, it is possible to apply a random forest, a support vector machine (SVM), boosting, a Bayesian network linear discrimination method, a non-linear discrimination method, or the like. In addition, a stand-alone high-performance computer using processors of a CPU and a graphics processing unit (GPU), or a cloud computer can be used as the learning machine.

Image Former 13

The image former 13 forms an image by, for example, an electrophotographic method. As illustrated in FIG. 1, the image former 13 includes writing units 131 respectively corresponding to basic colors of yellow (Y), magenta (M), cyan (C), and black (K), photosensitive drums 132, and developing devices 133 each storing a two-component developer including toner and a carrier of a corresponding one of the colors. The image former 13 further includes an intermediate transfer belt 134, a secondary transfer unit 135, and a fixing unit 136. Toner images formed on the photosensitive drums 132 by the developing devices 133 of the respective colors are superimposed on each other on the intermediate transfer belt 134 and transferred to the sheet 90 conveyed at a transfer position of the secondary transfer unit 135, and a full-color toner image is formed. The toner image on the sheet 90 is fixed on the sheet 90 by being heated and pressurized by the fixing unit 136 on the downstream side. The fixing unit 136 includes a heater and a non-contact temperature sensor, and power supply to the heater is controlled so that a temperature detected by the temperature sensor becomes a predetermined fixing control temperature.

Sheet Feeding Conveyor 14

The sheet feeding conveyor 14 feeds a sheet from each of trays and conveys the sheet to a conveyance path in the apparatus. The sheet feeding conveyor 14 includes a plurality of sheet feeding trays 141 on a main body side, a sheet feeding tray 142 for manual feed, conveyance paths 143 and 144, and the like. The conveyance paths 143 and 144 include a plurality of sheet detection sensors (representatively, only sensors s0 to s2 are illustrated) provided along these conveyance paths, conveyance rollers (roller pair), and one or a plurality of drive motors (representatively, only drive motor M1 is illustrated) that drives these conveyance rollers.

The sheet feeding tray 141 (or the sheet feeding tray 142) includes a pickup roller (also referred to as a feeding roller) that feeds the uppermost sheet among a plurality of the sheets 90 stacked on a stacking tray inside and placed, and feeds the sheets 90 in the sheet feeding tray one by one to the conveyance path on the downstream side. The medium sensor 18 is disposed on the upstream side from the image former 13 (more specifically, the transfer position of the secondary transfer unit 135 (hereinafter, simply referred to as an "image forming position")) on the conveyance path 143. As illustrated in FIG. 3, near the medium sensor 18, the conveyance path 143 is formed between guides formed of sheet metal or the like facing each other at a predetermined interval. The guides include an upper guide plate 1431 and a lower guide plate 1432 (see FIGS. 4 and 5). The sheet 90 conveyed on the conveyance path 143 is measured for sheet physical properties by the medium sensor 18.

In a case where double-sided printing is performed that forms an image also on the back surface of the sheet 90, the sheet 90 subjected to image formation on one side is conveyed to the conveyance path 144 in the lower part of an apparatus main body, for double-sided image formation. After the front and back sides are reversed in the switchback path, the sheet 90 conveyed to the conveyance path 144 joins the conveyance path 143 for one side, and is subjected to image formation on the other side of the sheet 90 by the image former 13 again. The sheet 90 subjected to image formation is discharged onto a discharge tray 145 outside the apparatus. The sheet detection sensors s0 to s2 and the like arranged in the conveyance paths 143 and 144 in the apparatus detect that the sheet 90 is present (or not present) and transmit a detection result to the controller 11. The controller 11 detects a conveyance jam (hereinafter, also simply referred to as "jam") of the sheet 90 when the sheet 90 does not reach or does not pass through the detection position of the sheet detection sensor at a predetermined timing.

Among the conveyance rollers provided along the conveyance paths 143 and 144, conveyance rollers provided immediately before the image forming position are particularly referred to as a registration roller r1. The sheet 90 fed and conveyed from one of the sheet feeding trays temporarily abuts against the registration roller r1 and stops. Reaching the registration roller r1 is detected by the sheet detection sensor s1 (also referred to as a registration sensor). At this time, a loop (slackness) of the sheet is formed by a difference in stop timing of the conveyance rollers on the upstream side of the registration roller r1, and skew correction is performed by aligning the leading end of the sheet with a shaft direction of the registration roller r1. In addition, the sheet 90 in a state of abutting against the registration roller r1 and stopping is re-conveyed and subjected to leading end timing adjustment, in synchronization with an image formation timing.

Operation Display 15

The operation display 15 includes a touch panel, a numeric keypad, a start button, a stop button, and the like, displays a state of the image forming apparatus 10, and is used to set a type of sheet placed on the sheet feeding tray 141 or the like and input an instruction from the user, in a manual setting mode. In addition, in a case where the sheet 90 (recording medium) out of product specifications to be described later is used, it is displayed that the recording medium is out of the product specifications, and/or execution permission of printing using the recording medium out of the product specifications by the user is received.

Communicator 16

The communicator 16 communicates with another external device such as an external PC terminal by a USB cable, a wired local area network (LAN), a wireless LAN (for example, a LAN conforming to the IEEE 802.11 standard), or the like.

Medium Sensor 18

As illustrated in FIG. 3, the medium sensor 18 mainly includes a paper thickness detector 40, a basis weight detector 50, and a surface property detector 60, and measures a plurality of sheet physical properties. A sheet pressing mechanism 69 presses the sheet 90 when the sheet physical properties are detected by the surface property detector 60. The sheet physical properties measured by the medium sensor 18 include paper thickness, basis weight, surface property, moisture content, and the like, as described below.

Among components of the medium sensor 18, which are the paper thickness detector 40, the basis weight detector 50, and the surface property detector 60, the paper thickness detector 40 is disposed on the upstream side in the conveyance direction, and the basis weight detector 50 and the surface property detector 60 are arranged on the downstream side. The basis weight detector 50 and the surface property detector 60 are arranged side by side in the width direction (X direction) at the same position in the conveyance direction. For example, the basis weight detector 50 is disposed on the front side in the X direction, and the surface property detector 60 is disposed on the back side. A main body of the surface property detector 60 is disposed on the upper side of the conveyance path 143, and the sheet pressing mechanism 69 is disposed on the lower side to face the surface property detector 60. On the conveyance path 143, conveyance rollers 41, 186, and 187 are arranged in order from the upstream side.

Paper Thickness Detector 40

In the paper thickness detector 40, when the sheet 90 is conveyed to a nip of the conveyance rollers 41, a shaft position of a driven roller is displaced depending on a thickness of the sheet 90. The thickness of the sheet 90 is measured by measuring a height of the displaced shaft. In the conveyance rollers 41, a roller on the lower side of the two rollers is a fixed (shaft center is fixed) drive roller, and a roller on the upper side is a driven roller biased to be separable toward the drive roller. A height of the roller on the upper side is detected by a displacement sensor. The displacement sensor includes an actuator (detection lever) that comes into contact with a shaft of the roller on the upper side and an encoder that measures an amount of rotation of the actuator. For example, a sheet thickness (microns) (hereinafter, also referred to as "paper thickness") is output from the paper thickness detector 40 as a measurement result of sheet physical properties.

Basis Weight Detector 50

Figure 4:
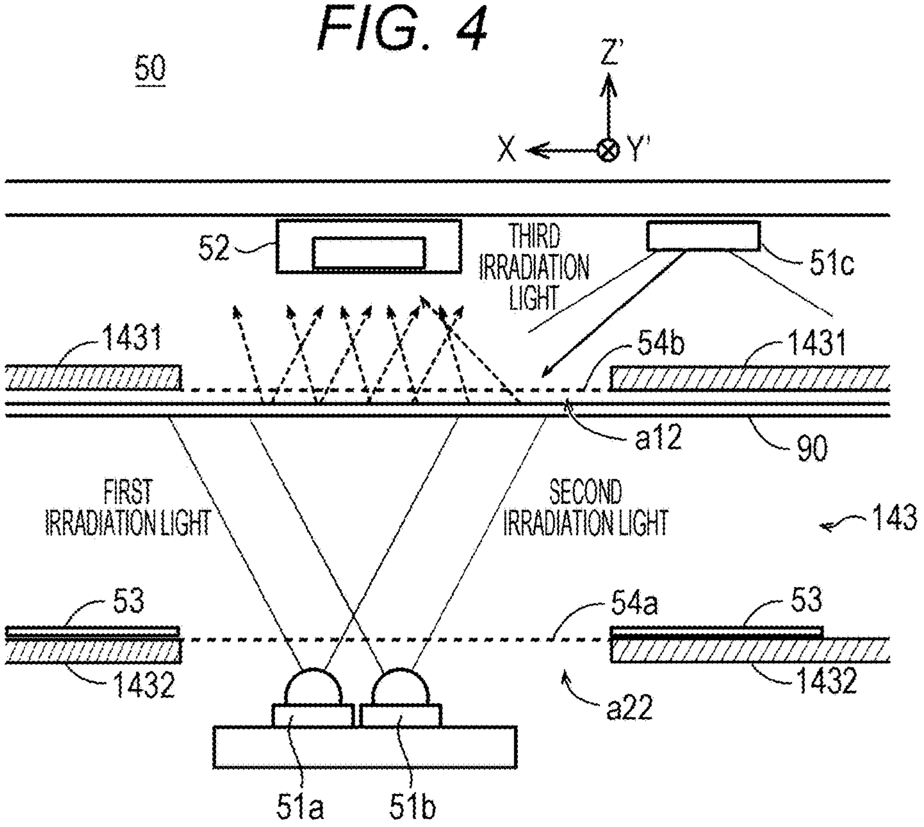
FIG. 4 is a schematic diagram illustrating a configuration of a basis weight detector of the medium sensor.

FIG. 4 is a schematic diagram illustrating a configuration of the basis weight detector 50. The basis weight detector 50 is a transmissive optical sensor that detects a physical property value depending on a basis weight of the sheet 90, includes a light emitter disposed below the conveyance path 143 and a light receiver disposed above the conveyance path 143, and measures an amount of attenuation (transmittance) of light transmitted through the sheet 90. For example, the transmittance (hereinafter, also simply referred to as "basis weight") is output from the basis weight detector 50 as a measurement result of the sheet physical properties.

As illustrated in FIG. 4, the basis weight detector 50 includes a plurality of light emitters 51 and a single light receiver 52. The light emitters 51 include a first light emitter 51*a*, a second light emitter 51*b*, and a third light emitter 51*c*. The first, second, and third light emitters irradiate an irradiation region with first irradiation light, second irradiation light, and third irradiation light, respectively. This irradiation region (second irradiation region) is an inner region in an opening a12 when viewed from the Z' direction. The opening a12 is provided in the upper guide plate 1431. In addition, the lower guide plate 1432 is also provided with an opening a22 at a position facing the opening a12. The openings a12 and a22 have the same shape, and are, for example, rectangular. To the openings a12 and a22, transparent sheets 54*a* and 54*b* formed of PET or the like through which wavelengths of respective irradiation lights are transmitted are attached to prevent foreign matter from adhering, such as paper dust from the sheet 90 passing through the conveyance path 143. Note that an opening all (see FIG. 5) for the surface property detector 60 is not attached with any sheet as described above, and adhesion of foreign matter is prevented by an opening/closing shutter (not illustrated) that closes the opening all in a case where detection of the surface property is not performed.

The first light emitter 51*a* emits the first irradiation light having a first wavelength. The first wavelength is, for example, a wavelength of near infrared light longer than a wavelength of visible light. More specifically, the first wavelength includes, for example, a wavelength between 750 nm and 900 nm. The second light emitter 51*b* emits second irradiation light having a second wavelength. The second wavelength is, for example, a wavelength of blue light included in the visible light. More specifically, the second wavelength includes, for example, a wavelength between 400 nm and 470 nm. Both the first light emitter 51*a* and the second light emitter 51*b* are arranged on the opposite side from the light receiver 52 with respect to the conveyance path 143, and the third light emitter 51*c* is provided on the same side as the light receiver 52 and in the vicinity of the light receiver 52. The third light emitter 51*c* emits third irradiation light having a third wavelength toward the irradiation region (opening a12). The third wavelength is, for example, a wavelength of green light in the visible light. More specifically, the third wavelength includes, for example, a wavelength between 495 nm and 570 nm. The third wavelength is a wavelength different from the first wavelength (for example, a wavelength between 750 nm and 900 nm) and the second wavelength (for example, 400 nm to 470 nm).

The third irradiation light is emitted toward the conveyance path 143 inside the upper and lower guide plates 1431 and 1432. A reflector 53 is provided inside the lower guide plate 1432 provided in the vicinity of the first light emitter 51*a* and the second light emitter 51*b*. The reflector 53 is painted in green, which is the same color as the third irradiation light, for example, and reflects the third irradiation light. Note that the reflector 53 does not reflect the first irradiation light (near infrared light) and the second irradiation light (blue light) that are not of the same color.

In the present embodiment, the controller 11 measures both a case where there is not the sheet 90 and a case where there is the sheet 90. At the time of measurement in the case where there is not the sheet 90, the first light emitter 51*a* and the second light emitter 51*b* are controlled to respectively emit the first irradiation light and the second irradiation light at different timings. The light receiver 52 receives the first irradiation light and the second irradiation light, detects amounts of the respective irradiation lights, and outputs the detected amounts of the first irradiation light and the second irradiation light to the controller 11. In addition, at the time of measurement in the case where there is the sheet 90, similarly, the sheet 90 conveyed to the position of the opening a12 is irradiated with the first irradiation light and the second irradiation light. The light receiver 52 receives transmitted lights (first transmitted light and second transmitted light) of the first irradiation light and the second irradiation light, detects amounts of light of respective irradiation lights, and outputs an amount of light of the first transmitted light and an amount of light of the second transmitted light detected to the controller 11. That is, the light receiver 52 detects the first irradiation light and the second irradiation light when there is not the sheet 90, and the first transmitted light and the second transmitted light when there is the sheet 90 at the opening a12.

Similarly, with respect to the third light emitter 51*c*, the light receiver 52 detects first reflected light reflected by the reflector 53 when there is not the sheet 90 and second reflected light reflected by a surface of the sheet 90 when the sheet 90 is at the opening a12.

The controller 11 calculates a first transmittance by dividing the amount of light of the first transmitted light by the amount of light of the first irradiation light. Similarly, a second transmittance is calculated by division of the amount of light of the second transmitted light by the amount of light of the second irradiation light. Then, the type of the sheet 90 is determined from the first and second transmittances and a determination criterion stored in the storage 12.

Surface Property Detector 60

Figure 5:
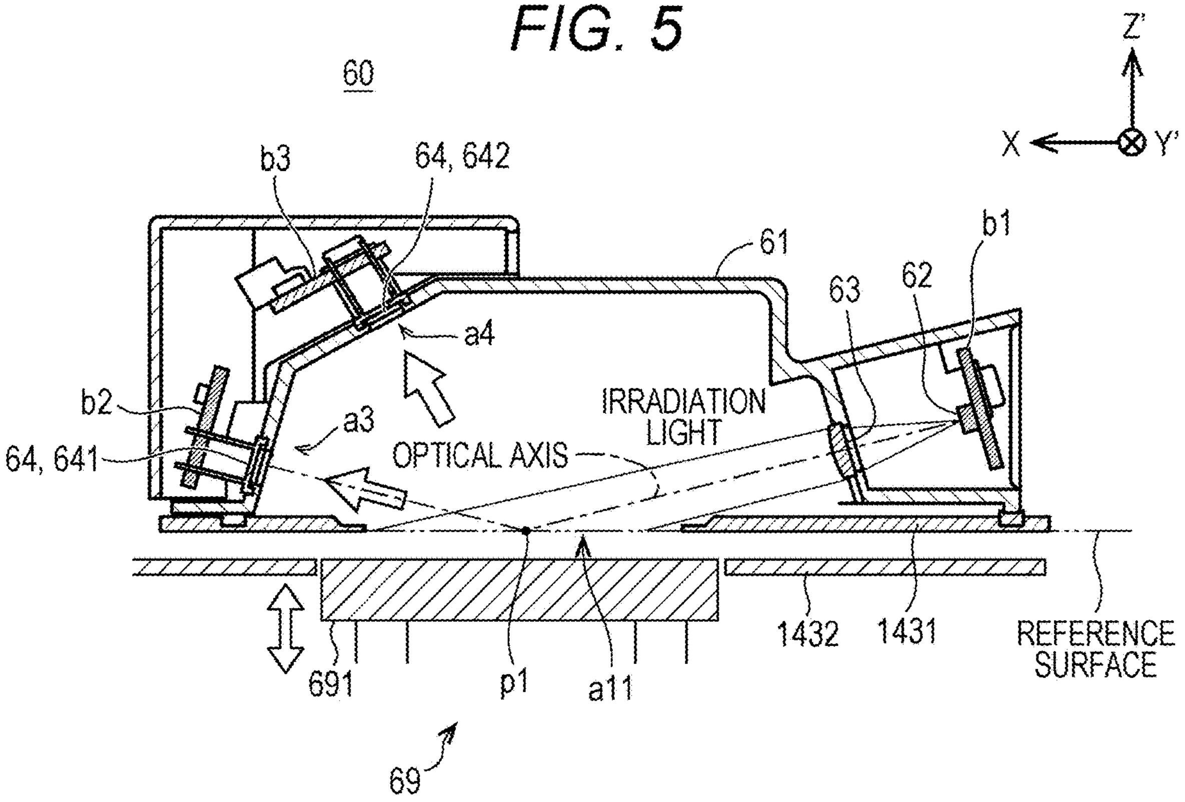
FIG. 5 is a cross-sectional view of a surface property detector of the medium sensor.

FIG. 5 is a cross-sectional view of the surface property detector 60. The surface property detector 60 includes a housing 61, a light emitter 62, a collimating lens 63, and a plurality of light receivers 64 (641, 642), and optically detects regular reflection light and diffuse reflection light from a sheet surface as described below. The upper guide plate 1431 is provided with the opening all (measurement region/irradiation region), and the opening all is an irradiation region by the light emitter. An intersection p1 illustrated in the figure is a substantially center position of the irradiation region. The sheet 90 conveyed to the opening all is temporarily stopped. In that state, the sheet 90 is pressed by the sheet pressing mechanism 69 from the lower side, and is positioned. A reference surface in the opening all is a virtual surface including the lower surface of the upper guide plate 1431, and at the time of measurement, the surface of the positioned sheet 90 that is an object to be measured is arranged on the reference surface. Irradiation light made substantially parallel by the collimating lens is emitted from the light emitter at an incident angle of 75° with respect to the reference surface. The wavelength of the irradiation light is, for example, 465 nm. The plurality of light receivers 64 receives regular reflection light and diffuse reflection light. For example, they are arranged at three places of a reflection angle of 30 degrees (for diffuse reflection light), 60 degrees (for diffuse reflection light), and 75 degrees (for regular reflection light), or two places of 60 degrees and 75 degrees. A signal of the light receiver is output from the surface property detector 60 as a measurement result of the sheet physical properties (hereinafter also referred to as "surface property 1").

Sheet Pressing Mechanism 69

The sheet pressing mechanism 69 is disposed below the lower guide plate 1432. The sheet pressing mechanism 69 includes a pressing unit 691. The sheet pressing mechanism 69 includes a drive motor, a cam mechanism, and the like (none of them are illustrated). The upper surface of the pressing unit 691 is a flat surface that moves up and down by driving of the drive motor and is parallel to the lower guide plate 1432, and is substantially the same surface as the lower guide plate 1432 during normal sheet passage, but moves up to press the sheet 90 against the upper main body side of the surface property detector 60 during measurement. In a pressed state, conveyance of the sheet 90 is stopped.

Other Outputs of Medium Sensor 18

As described above, the paper thickness, the basis weight, and the surface property 1 are output as the paper properties from the paper thickness detector 40, the basis weight detector 50, and the surface property detector 60, respectively; however, the medium sensor 18 may include other sensors other than this, and output other sheet physical properties from these sensors. For example, the medium sensor 18 may include sensors that output "surface property 2", "moisture content", and "sheet thickness (double feed)" as measurement results as the sheet physical properties. As the "surface property 2", an index regarding an amount of depth of the sheet 90 is obtained. Specifically, the surface of the sheet 90 is irradiated with light at a large incident angle (greater than or equal to 80 degrees and less than 90 degrees), this state is imaged, and obtained image data is subjected to image processing, whereby an index regarding the amount of depth depending on an unevenness state of the surface is output as a measurement result. The "moisture content" can be measured by, for example, a moisture content sensor that optically detects an amount of light absorption of OH groups of a near infrared method. This moisture content sensor uses a property in which the sheet 90 is irradiated with light of a predetermined wavelength in a near infrared region, and an absorption rate of the light changes depending on the moisture content of the sheet 90. The moisture content sensor outputs, for example, a moisture content as a measurement result of the sheet physical properties. The sheet thickness (double feed) is measured by an ultrasonic sensor. The ultrasonic sensor includes a transmitter and a receiver, and is disposed to straddle the conveyance path 143. An ultrasonic wave transmitted from the transmitter transmits through the sheet 90 and is received by the receiver. A thickness of the sheet, that is, presence or absence of double feed in which two or more sheets are conveyed in a state of being overlapped is detected by a degree of decrease in an amount of a signal received by the receiver. It is possible to determine whether or not the sheet is an envelope by a detection output of the ultrasonic sensor.

Sheet Type Determination Processing

The sheet type determiner 111 performs sheet type determination on the basis of the sheet physical properties detected by the medium sensor 18. Specifically, the sheet type determiner 111 causes the sheet 90 that is a measurement target to be conveyed on the conveyance path 143, and acquires detection data by the paper thickness detector 40, the basis weight detector 50, and the surface property detector 60 of the medium sensor 18. Hereinafter, the detection data of the paper thickness by the paper thickness detector 40 is referred to as a measurement value 1, the detection data of the basis weight of the sheet by the basis weight detector 50 is referred to as a measurement value 2, and the detection data of the surface property by the surface property detector 60 is referred to as a measurement value 3. The sheet type determiner 111 performs the sheet type determination (sheet classification determination) and determination of the basis weight category by using the acquired measurement values 1 to 3 (or average data thereof) and the learned model (sheet type discrimination engine). Alternatively, the sheet type determiner 111 performs the sheet type determination (sheet classification determination) and determination of the basis weight category by using the acquired measurement value 1, measurement value 2, and measurement value 3 (or average data thereof) and the paper profile. Examples of the sheet type determination include a gloss sheet, a matte sheet, a plain sheet, a high gloss sheet, a coated sheet, and an envelope. Examples of the basis weight category are classified into the following 12 categories. Note that the following categories are examples, and classification may be performed by categories different from these. Note that, in the following description, in the sheet feeding tray 141 on the main body side other than the sheet feeding tray 142 for manual feed, in a case where the sheet classification is the coated sheet or the envelope, the sheet is out of product specifications. In addition, the sheet for which the sheet type (basis weight category) is determined to be categories 11 and 12 is a sheet out of the product specifications. (Category 1) less than or equal to 61 $g/m^2$, (Category 2) 62 to 75 $g/m^2$, (Category 3) 76 to 81 $g/m^2$, (Category 4) 82 to 92 $g/m^2$, (Category 5) 93 to 106 $g/m^2$, (Category 6) 107 to 136 $g/m^2$, (Category 7) 137 to 177 $g/m^2$, (Category 8) 178 to 217 $g/m^2$, (Category 9) 218 to 257 $g/m^2$, (Category 10) 258 to 301 $g/m^2$, (Category 11) 302 to 351 $g/m^2$, (Category 12) greater than or equal to 352 $g/m^2$.

Print Processing in First Embodiment

Figure 6:
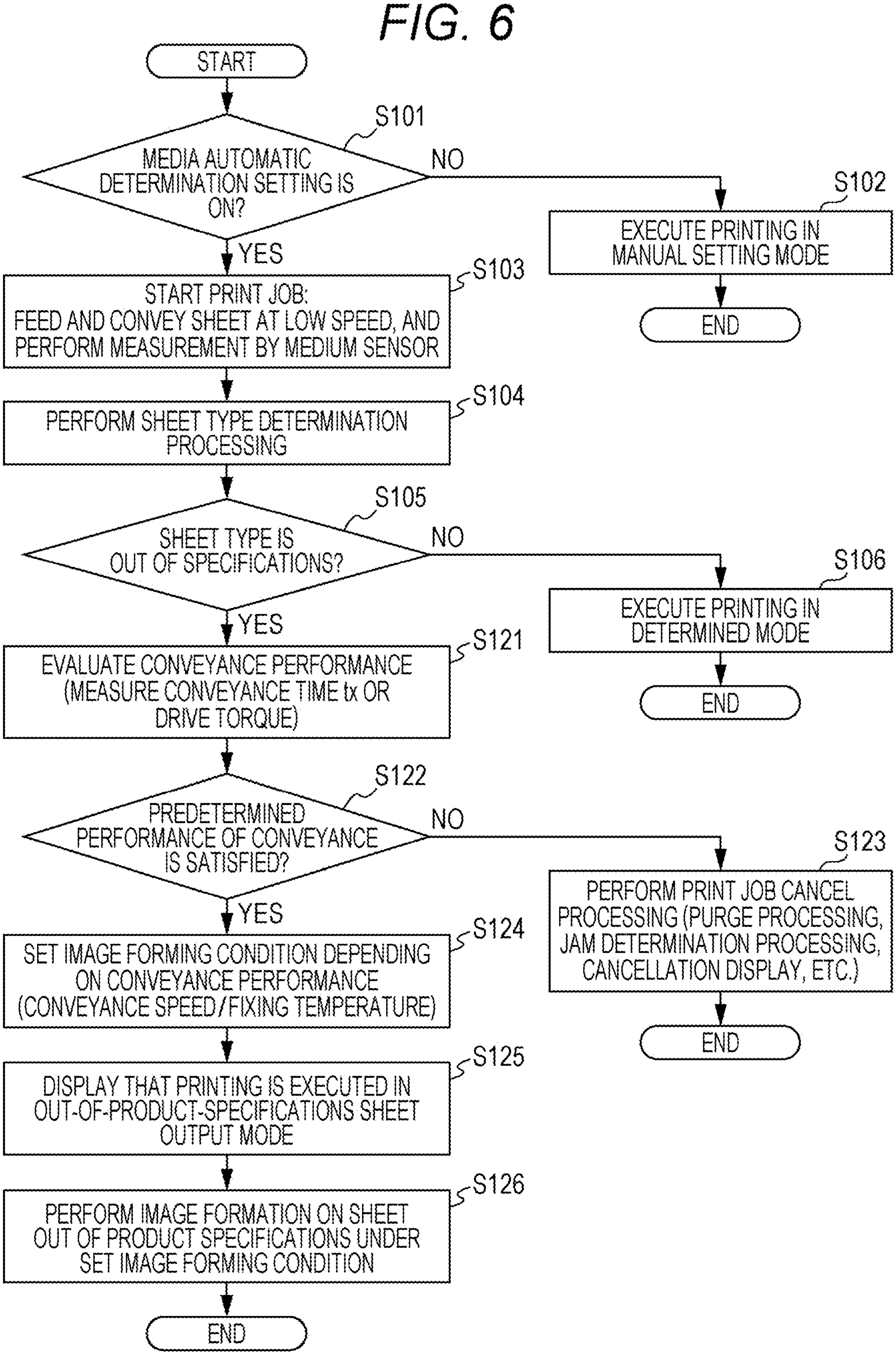
FIG. 6 is a flowchart illustrating print processing in a first embodiment.

FIG. 6 is a flowchart illustrating print processing in a first embodiment, and the print processing is mainly executed by the controller 11 of the image forming apparatus 10.

Step S101

The image forming apparatus 10 starts execution of a received print job. If a media automatic setting mode is enabled (YES), the controller 11 advances the processing to step S103. On the other hand, if the manual setting mode is enabled (NO), the processing proceeds to step S102.

Step S102

After a setting of a sheet type by the user's input through the operation display 15 is received, an image forming condition corresponding to the set sheet type is set, and printing is executed by normal print processing, and the processing is ended (end).

Step S103

The controller 11 controls the sheet feeding conveyor 14 to feed and convey the sheet 90 from the sheet feeding tray 141. At this time, since the mode is the automatic setting mode, conveyance is performed at a conveyance speed lower than a normal (at the time of image formation) conveyance speed (for example, 250 mm/sec, hereinafter also referred to as "standard speed vs") of the plain sheet. Then, the sheet physical properties of the sheet 90 are measured by the medium sensor 18.

Step S104

The sheet type determiner 111 performs the sheet type determination processing described above on the basis of the sheet physical properties (measurement values 1 to 3) obtained in step S103.

Step S105

As a result of the determination in step S104, if the sheet type is a sheet out of the product specifications (YES), for example, in the case of a basis weight of Category 11 (350 $g/m^2$), a coated sheet, or an envelope, the controller 11 advances the processing to step S121. On the other hand, if the sheet is within the product specifications (NO), the processing proceeds to step S106.

Step S106

Here, an image forming condition corresponding to an automatically set sheet type is set for the sheet 90 within the product specifications, and printing is executed by normal print processing, and the processing is ended.

Step S121

Figure 7:
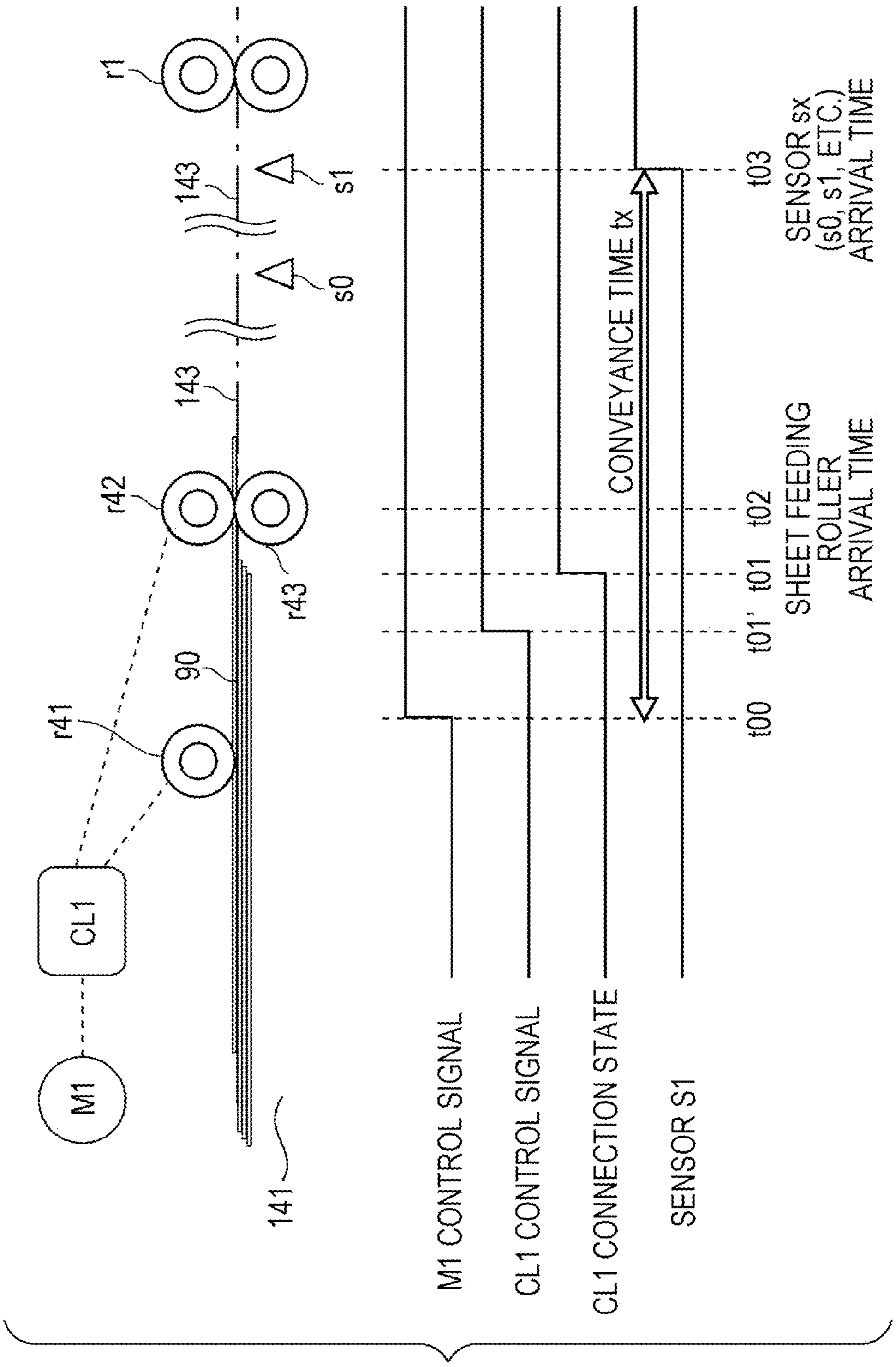
FIG. 7 is a schematic diagram for explaining a conveyance time as an example of an evaluation index of conveyance performance.
Figure 8:
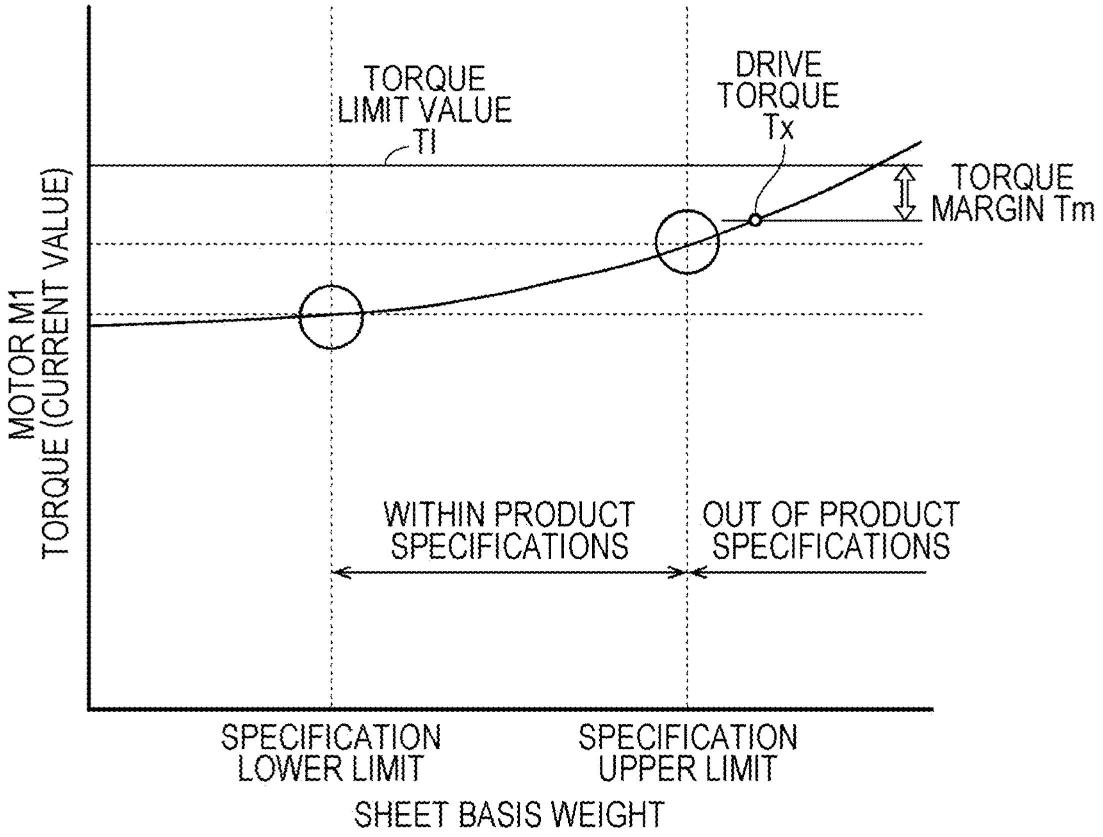
FIG. 8 is a schematic diagram for explaining a torque margin as an example of the evaluation index of the conveyance performance.

The conveyance performance determiner 112 evaluates conveyance performance for the sheet 90. As evaluation indexes of the conveyance performance, conveyance time and a drive torque (torque margin) can be adopted as described below. FIG. 7 is a schematic diagram for explaining a conveyance time tx as an example of the evaluation index of the conveyance performance. FIG. 8 is a schematic diagram for explaining the torque margin as an example of the evaluation index of the conveyance performance; FIG. 9 is a table indicating the evaluation indexes and determination thresholds.

Evaluation of Conveyance Performance by Conveyance Time tx

As an evaluation index of the conveyance performance, the conveyance time tx may be adopted as described below. As illustrated in FIG. 7, the drive motor M1 drives each conveyance roller of the conveyance path 143 including the registration roller r1, and a pickup roller r41, a sheet feeding roller r42, and a separating roller r43 of the sheet feeding tray 141. Among them, drive transmission of the drive motor M1 is turned on/off by a clutch CL1 for the pickup roller r41, the sheet feeding roller r42, and the separating roller r43. The pickup roller r41 and the separating roller r43 rotate in the same direction (counterclockwise in the figure) (that is, the outer circumferential surfaces of both rollers move in directions opposite to each other at contact positions of both rollers). The sheet feeding roller r42 applies conveyance force in a forward direction, that is, conveyance force to move the sheet 90 the right direction in the figure. On the other hand, the separating roller r43 applies conveyance force in a reverse direction to the sheet 90. The conveyance force of the sheet feeding roller r42 is set to be stronger than the conveyance force of the separating roller r43 by a torque limiter provided in a drive system of the separating roller r43. As a result, the conveyance force in the forward direction (rightward) is applied to the uppermost sheet 90, and the conveyance force in the reverse direction is applied to the second and subsequent sheets 90 to prevent double feeding (conveyance of two or more sheets).

As illustrated in FIG. 9, the conveyance performance is determined on the basis of whether a delay time td of the sheet 90 to be used is within a predetermined value x1 that is a determination threshold or exceeds the predetermined value x1. The delay time td is calculated by subtracting a standard time ts set in advance from the conveyance time tx (delay time td=tx−ts).

The standard time ts is a time from when a control signal ON of the drive motor M1 of the sheet feeding tray 141 is output (t00) until the sheet 90 to be evaluated actually reaches a detection position of a sheet detection sensor sx (t03). The sheet detection sensor sx is a sheet detection sensor disposed at a predetermined position between the image forming position and the sheet feeding tray 141 (or the sheet feeding tray 142) on which the target sheet 90 is placed, in the conveyance path 143. For example, the sheet detection sensor sx mentioned here may be any of the sheet detection sensors s0 and s1 illustrated in FIG. 1.

The standard time ts=a standard time t1+a standard time t2+a standard time t4. The standard time t1 is calculated from an ON request time of the sheet feeding clutch CL1, an activation time of the drive motor M1, a connection time of the clutch CL1, and a control period, from an activation request of the drive motor M1. The standard time t2 is a time from the connection of the sheet feeding clutch CL1 to reaching at the sheet feeding roller r42. It is calculated from a conveyance speed by the pickup roller r41 and a distance between the pickup roller r41 and the sheet feeding roller r42 (nip). The standard time t3 is a time from reaching at the sheet feeding roller r42 to reaching at the sheet detection sensor sx. It is calculated from a conveyance speed of the sheet feeding roller r42 (and the conveyance rollers in the conveyance path 143) and a path length from the sheet feeding roller r42 to the sheet detection sensor sx in the conveyance path 143.

In the sheet out of the product specifications (for example, in the case of using a thick sheet having a basis weight of 350 $g/m^2$), slip is likely to occur at the time of pickup by the pickup roller r41 or at the time of conveyance by the sheet feeding roller r42 and the conveyance rollers on the conveyance path 143. When the slip occurs, a delay occurs in a period corresponding to the standard times t2 and t3, and an actual conveyance time becomes longer than the standard times t2 and t3. If the sheet conveyance takes longer than the assumed standard time, problems occur, such as an image leading end position shift and a jam. A risk of occurrence of these problems is determined from the delay time td. That is, as illustrated in FIG. 9, the conveyance performance determiner 112 determines that certain conveyance performance is satisfied for the target sheet 90 and the risk of occurrence of the problems is low if the delay time td falls within the predetermined value x1, and determines that the conveyance performance is not satisfied and the risk of occurrence of the problems is high in a case where the delay time td exceeds the predetermined value x1.

Evaluation of Conveyance Performance by Drive Torque Tx

As an evaluation index of the conveyance performance, a drive torque Tx of the drive motor M1 may be adopted as described below. The drive torque Tx of the drive motor M1 can be detected by a torque detector (see FIG. 2). The torque detector is a driver current detection circuit arranged on a printer control board, and includes a shunt resistor, a voltage dividing resistor, a differential amplifier, a filter circuit, and the like. The torque detector calculates the drive torque Tx from the power supply current flowing into a motor driver that controls operation of the drive motor M1.

As illustrated in FIG. 9, the conveyance performance is determined on the basis of whether a torque margin Tm at the time of conveying the sheet 90 is greater than or equal to a predetermined value y1 that is a determination threshold or less than the predetermined value y1. The torque margin Tm is calculated by subtracting the maximum torque Tx at the time of conveyance in a determination section from a torque limit value T1 (torque margin Tm=T1−Tx). Here, the determination section is any section of a section from a position where feeding of the target sheet 90 is started to a position of detection by the sheet detection sensor s1 (registration sensor) upstream from the image forming position. For example, the determination may be performed by setting an entire section as the determination section and by the torque Tx in a section corresponding to the conveyance time tx in FIG. 7, or may be performed by the torque Tx in a shorter section, for example, a section corresponding to a time from t00 to t02 or a section corresponding to a time from t00 to when the sheet detection sensor s0 detects the sheet 90. In addition, the determination section may be a section corresponding to a time from t0 until a predetermined time elapses.

In the sheet out of the product specifications (for example, in the case of using a thick sheet having a basis weight of 350 $g/m^2$), the drive torque at the time of picking up and conveying the sheet increases. When the drive torque (load) exceeds the torque limit value T1 on the specifications of the drive motor M1, step-out of the motor occurs, and defects such as a jam occur. The risk of occurrence of these defects is determined from the torque margin Tm. As illustrated in FIG. 9, the conveyance performance determiner 112 determines that certain conveyance performance is satisfied for the target sheet 90 and the risk of occurrence of the defects is low if the torque margin Tm is greater than or equal to the predetermined value y1, and determines that the target sheet does not satisfy the conveyance performance and the risk of occurrence of the defects is high if the torque margin Tm is less than the predetermined value y1.

Step S122

The image formation determiner 113 determines whether or not the conveyance performance for the target sheet 90 satisfies the predetermined performance by the conveyance time tx or the drive torque Tx by the processing as described with reference to FIGS. 7 to 9, and in a case where the predetermined performance is satisfied (YES), advances the processing to step S124 to cause the image formation to be canceled. On the other hand, in a case where the predetermined performance is not satisfied (NO), the processing proceeds to step S123.

Step S123

The image formation determiner 113 performs print job (image formation) cancel processing. Specifically, display is performed indicating that the print job has been cancelled because the sheet 90 is out of the product specifications, on the operation display 15. In addition, in accordance with this, one of the following two pieces of post-processing is performed. Post-processing 1: So-called purge processing is performed, in which the image former 13 does not perform image formation on the sheet 90 being conveyed, and the sheet is discharged to the discharge tray 145 outside the apparatus in a state of being a blank sheet via the conveyance path 143. Post-processing 2: Jam determination processing is performed, in which if the conveyance performance is worse (for example, in a case where a predetermined threshold x2 larger than the predetermined threshold x1 is exceeded), the sheet is immediately stopped at a predetermined position on the conveyance path 143, or stopped before the registration rollers r1 without being re-conveyed, and jam determination is performed. Then, display is performed on the operation display 15 indicating a jam state, to prompt the user to manually remove the target sheet 90.

Step S124

The image formation determiner 113 sets an image forming condition depending on the conveyance performance evaluated in step S121. Specifically, the image formation determiner 113 sets the image forming condition depending on the conveyance time tx or the drive torque Tx. The image forming condition may be calculated by a predetermined primary calculation formula depending on a value of the conveyance time tx or the drive torque Tx, or may be set in a plurality of stages depending on a range of the value (see FIG. 10 to be described later). Examples of the image forming condition include a conveyance speed of the sheet 90 and a fixing control temperature of the fixing unit 136. In addition, a setting current of the drive motor M1 may be changed depending on the drive torque Tx.

FIG. 10 is a control table indicating a relationship between the conveyance performance and the image forming conditions. This control table is stored in advance in the storage 12. FIG. 10 illustrates the relationship between the evaluated delay time td (conveyance time tx), the conveyance speed and the fixing control temperature set depending on a value of the delay time td. For example, if the delay time td is less than or equal to a predetermined threshold x0 (where x0<x1), the image formation determiner 113 sets the conveyance speed to 0.5 times the standard speed vs, and sets the fixing control temperature to high temperature 1 higher than a normal temperature (for plain sheet).

Step S125

Figure 11:
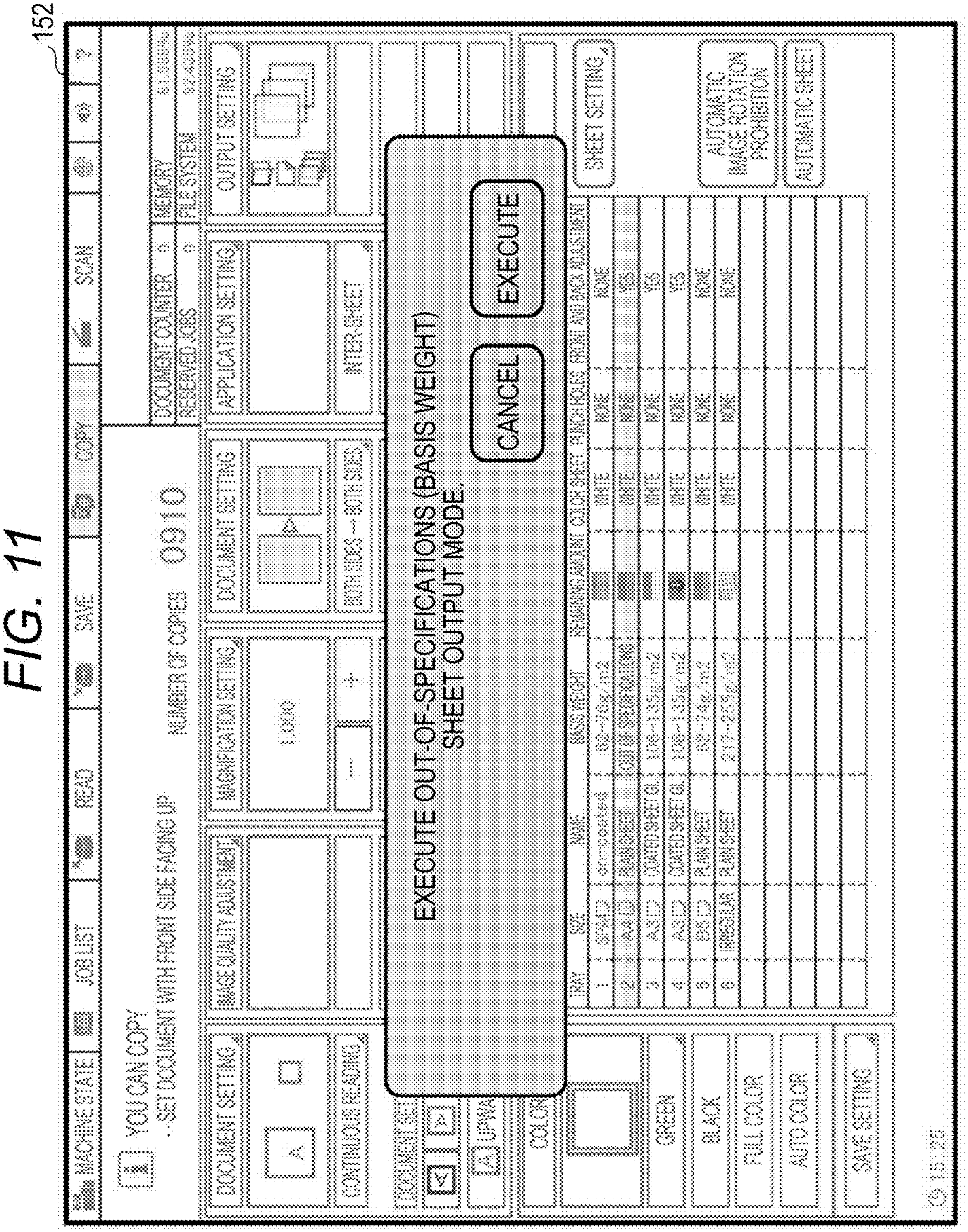
FIG. 11 is an example of an operation screen displayed in step S125.

The controller 11 causes the operation display 15 to display that it is an out-of-product-specifications sheet output mode. FIG. 11 is an example of an operation screen 152 displayed on the operation display 15 in a case where a sheet out of the product specifications is used. At the time of this display, as illustrated in the operation screen 152, execution permission of printing using the sheet 90 out of the product specifications by the user may be received. The user performs execution permission by operating an execution button on the operation screen 152. On the other hand, the user can cancel the print job by operating a cancel button on the operation screen 152.

Step S126

The controller 11 performs image formation on the target sheet 90 under the image forming condition set in step S124. For the second and subsequent sheets 90 of the same print job (using the same sheet), the processing of step S103 and subsequent steps may be repeated, or the processing of steps S103 to S125 may be skipped, and only step S126 may be repeated, and image formation up to the last sheet may be performed under the same image forming condition.

As described above, the image forming apparatus 10 according to the first embodiment includes the image formation determiner 113 that determines whether or not to perform image formation on the basis of the conveyance performance determined by the second determiner (conveyance performance determiner 112) in a case where the type of the recording medium determined by the first determiner (sheet type determiner 111) on the basis of the sheet physical properties measured by the medium sensor is a type out of the product specifications. As a result, even in a case where a recording medium out of the product specifications is used, it is possible to automatically determine whether or not image formation is possible depending on the conveyance performance. Furthermore, in a case where image formation is to be executed even when the recording medium is of the type out of the product specifications, the image formation determiner 113 of the image forming apparatus 10 causes image formation to be executed under an image forming condition set depending on the determined conveyance performance. As a result, even in a case where a sheet out of the product specifications is used, an appropriate sheet conveyance condition and an image forming condition can be automatically set.

Second Embodiment

In the first embodiment, the image forming condition is set depending on the conveyance performance, but in a second embodiment described below, in addition to this, the image forming condition is set further depending on a document type.

FIGS. 12A to 12C are diagrams for explaining image forming conditions depending on determination of document types in the second embodiment. FIGS. 12A to 12C are a control table and the like used in the setting of the image forming condition in step S124 in FIG. 6 instead of the control table in FIG. 10. In the second embodiment, the description similar to that of the first embodiment except for the configuration illustrated in the figures will be omitted.

FIG. 12A is a control table illustrating a relationship among the conveyance performance, the document type, and the image forming condition. In FIG. 12A, a case of a sheet within a specification range is described as a reference. In the case of the sheet within the specification range, image formation is performed under a normal image forming condition.

As illustrated in FIG. 12A, in a case where the conveyance performance is unsatisfactory (step S122: NO in FIG. 6), the image formation determiner 113 does not set the image forming condition not to permit image formation. On the other hand, in a case where the conveyance performance is satisfactory (step S122: YES in FIG. 6), the image formation determiner 113 sets the image forming condition to condition 1 or condition 2 depending on the document type. The document types are classified by a table illustrated in FIG. 12B. A table illustrated in FIG. 12C is referred to for conditions 1 and 2 of the image forming condition to be set.

As illustrated in FIG. 12B, the image formation determiner 113 analyzes the document type from the setting of a full-color or monochrome color mode set in the print job to be executed, and image information of a graphic or text included in print data of the print job. For example, the image formation determiner 113 performs image analysis on the print data to determine whether the document is a document including a graphic or a document including only text data. This determination may be made only by the color mode, or may be made only by the image. The determination may be made by a combination of both. In the case of the latter combination, it may be determined as type 1 in a case where one is full-color or a graphic, and it may be determined as type 2 in a case where both are monochrome and text.

As illustrated in FIG. 12C, the image formation determiner 113 sets the image forming conditions so that more margin is provided (hereinafter, also referred to as looser image forming conditions) for the conveyance performance and image quality (fixing performance) in the order of conditions 1, 2, and 3. For example, in condition 2, the conveyance speed is set to low speed 2, which is a speed slower than low speed 1. For example, low speeds 1, 2, and 3 are 0.7 times, 0.5 times, and 0.3 times the standard speed vs, respectively.

As described above, in the image forming apparatus 10 according to the second embodiment, the image formation determiner 113 sets the image forming condition depending on the conveyance performance and further on the determined document type. As a result, effects similar to those of the first embodiment can be obtained, and further, in the second embodiment, a more appropriate image forming condition can be set.

Third Embodiment

Next, the image forming apparatus 10 according to a third embodiment will be described with reference to FIGS. 13, 14A, and 14B. In the third embodiment, jam occurrence information is used as history data, and it is determined whether or not image formation is possible depending on the occurrence history.

Figure 13:
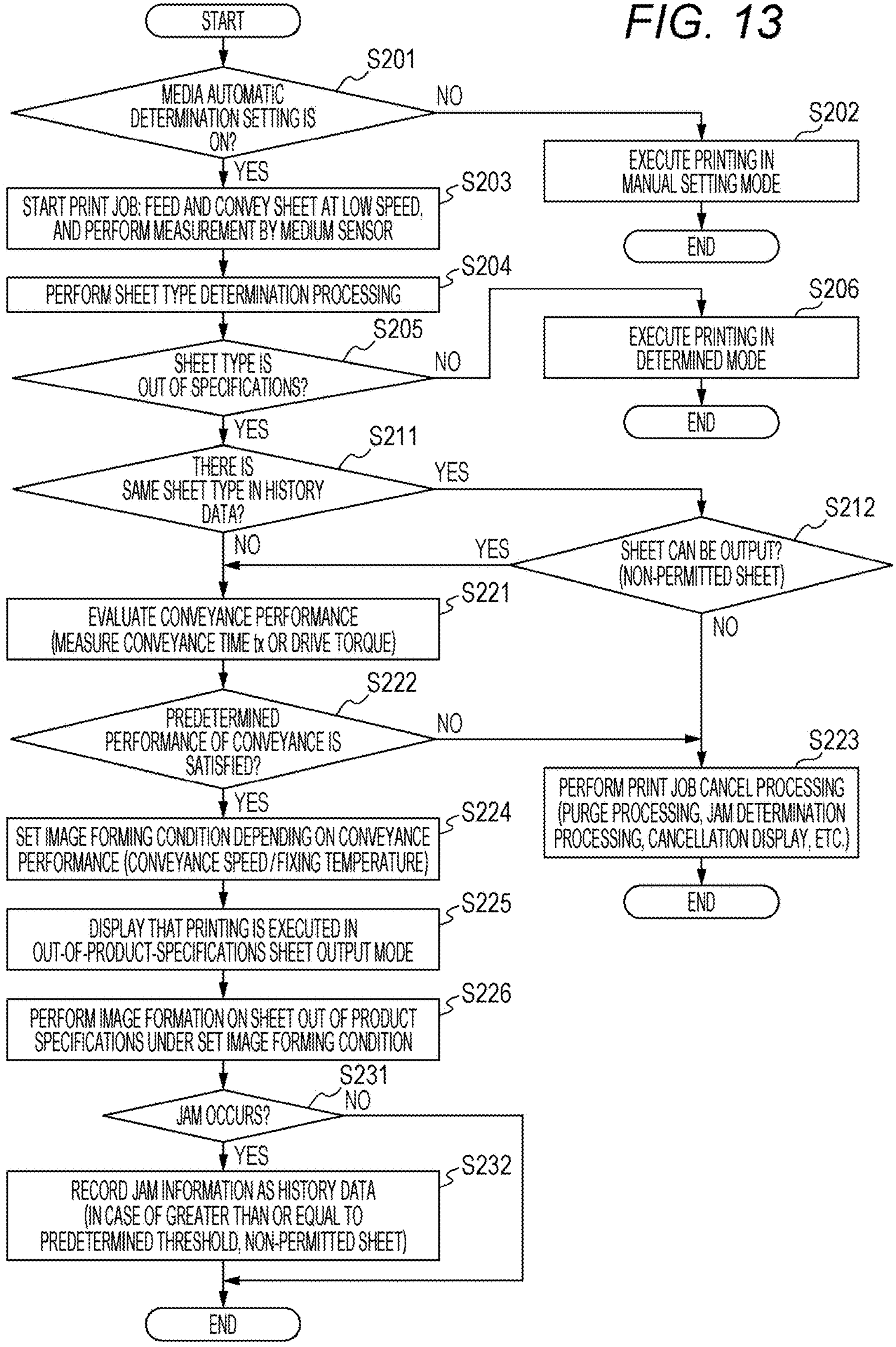
FIG. 13 is a flowchart illustrating print processing in a third embodiment.

FIG. 13 is a flowchart illustrating print processing in the third embodiment. FIGS. 14A and 14B are diagrams for explaining determination of permission and non-permission of image formation depending on a jam occurrence history; FIG. 14A illustrates history data, and FIG. 14B illustrates a determination table used for determination of the number of times of jam occurrence and permission/non-permission of image formation.

Steps S201 to S206

The controller 11 (or the sheet type determiner 111) executes the processing of steps S201 to S206, and executes the print processing depending on a set mode or a determined sheet type. These pieces of processing are pieces of processing corresponding to steps S101 to S106 in FIG. 6 as they are, and the description thereof will be omitted.

Step S211

In a case where it is determined in step S205 that the type of sheet is a type out of the product specifications, the image formation determiner 113 refers to the history data in the storage 12 and confirms whether data related to the same type of the sheet 90 is accumulated. As illustrated in FIG. 14A, for example, if the sheet type determined in step S204 is out-of-product-specifications sheet type 01 having the same classification and basis weight, the image formation determiner 113 determines that there is history data (YES) and advances the processing to step S212. On the other hand, if there is no history data of the same type (if it is a new sheet type), the processing proceeds to step S221.

Step S212

The image formation determiner 113 refers to the number of times of jam occurrence from the history data having a common sheet type, collates the number of times of jam occurrence with the determination table of FIG. 14B, and determines whether image formation is permitted or not. In a case where the number of times of jam occurrence in the history data is less than a predetermined threshold N1, the sheet is permitted, that is, a sheet that can be output (YES), and thus the processing proceeds to step S221, and in the subsequent processing, it is determined whether or not to perform image formation on the basis of the conveyance performance. On the other hand, in a case where the number of times of jam occurrence is greater than or equal to the predetermined threshold N1, the sheet is not permitted, that is, the sheet is not a sheet that can be output (NO), and thus the processing proceeds to step S223. Then, the image formation determiner 113 causes the image formation to be canceled regardless of a determination result of evaluation of the conveyance performance.

Steps S221 to S226

The controller 11 (or the conveyance performance determiner 112, or the image formation determiner 113) executes the processing of steps S221 to S226, determines whether or not image formation is possible on the basis of the determined conveyance performance, and cancels the image formation or executes the image formation under the image forming condition depending on the conveyance performance. These pieces of processing are pieces of processing corresponding to steps S121 to S126 in FIG. 6 as they are, and the description thereof will be omitted.

Step S231

If a jam occurs at the time of image formation on the sheet 90 (YES), the controller 11 advances the processing to step S232. On the other hand, if the jam does not occur (NO) and the image formation is normally ended, step S232 is skipped and the processing is ended.

Step S232

The controller 11 records the jam occurrence information in the history data. In the case of a new type of sheet, new history data is generated, and in the case of an existing type, the number of times of occurrence is incremented. Note that, in a case where the number of times of occurrence is greater than or equal to the predetermined threshold N1 due to the increment, even if the sheet 90 is used thereafter, it is determined as non-permission by the processing of steps S211 to S212.

As described above, in the image forming apparatus 10 according to the third embodiment, in a case where the jam occurrence history is less than or equal to the predetermined threshold in the history data, the image formation is caused to be executed on the basis of the conveyance performance determined by the second determiner, and if the jam occurrence history exceeds the predetermined threshold, the image formation is caused to be canceled regardless of the determination result of the second determiner. Thus, repeated jam occurrence can be suppressed.

Fourth Embodiment

Next, the image forming apparatus 10 according to a fourth embodiment will be described with reference to FIGS. 15, 16A, and 16B. In the fourth embodiment, the jam occurrence information is used as the history data, and the image forming condition or non-permission information is set depending on the occurrence history.

Figure 15A:
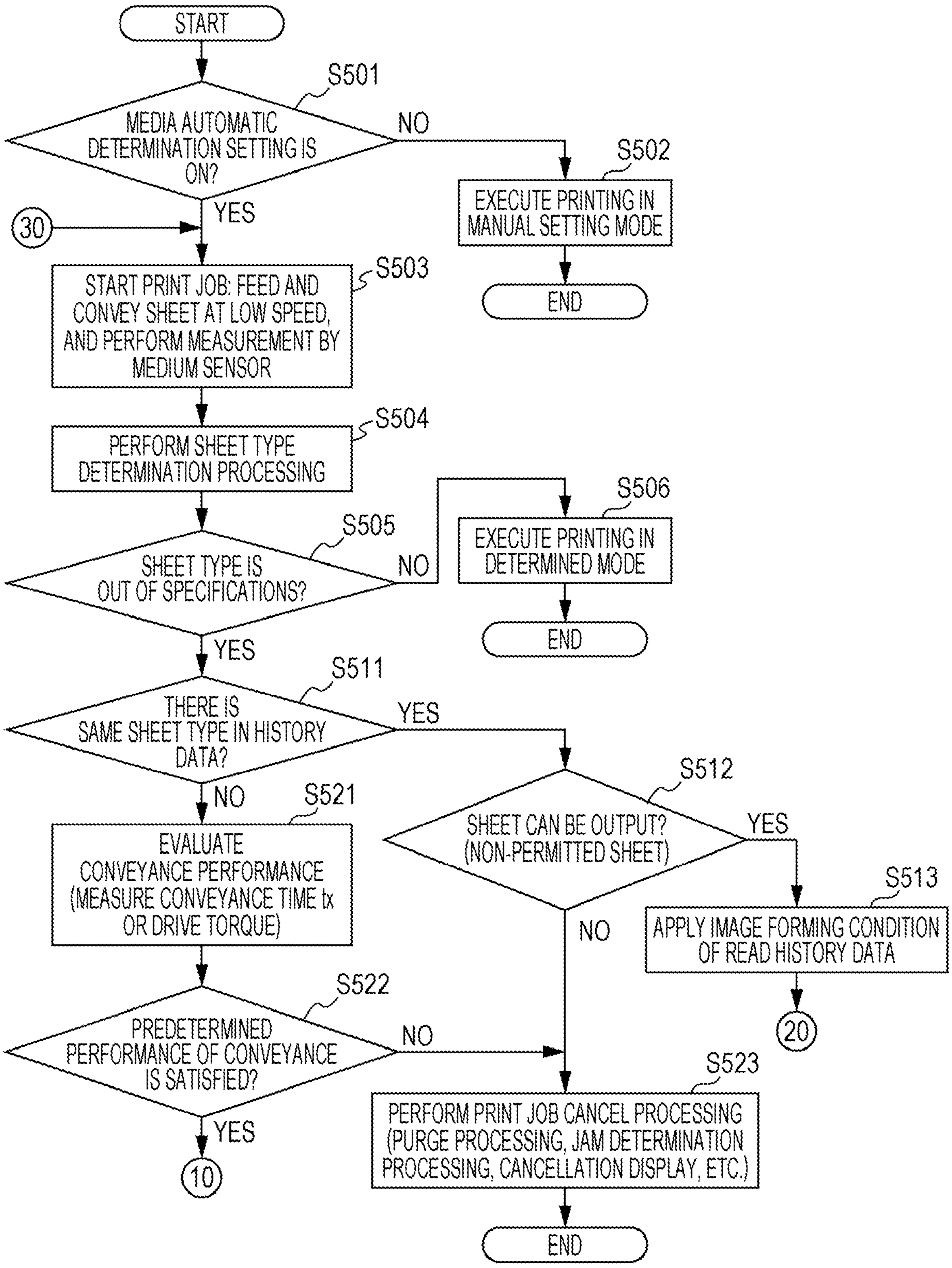
FIGS. 15A and 15B are flowcharts illustrating print processing in a fourth embodiment.
Figure 15B:
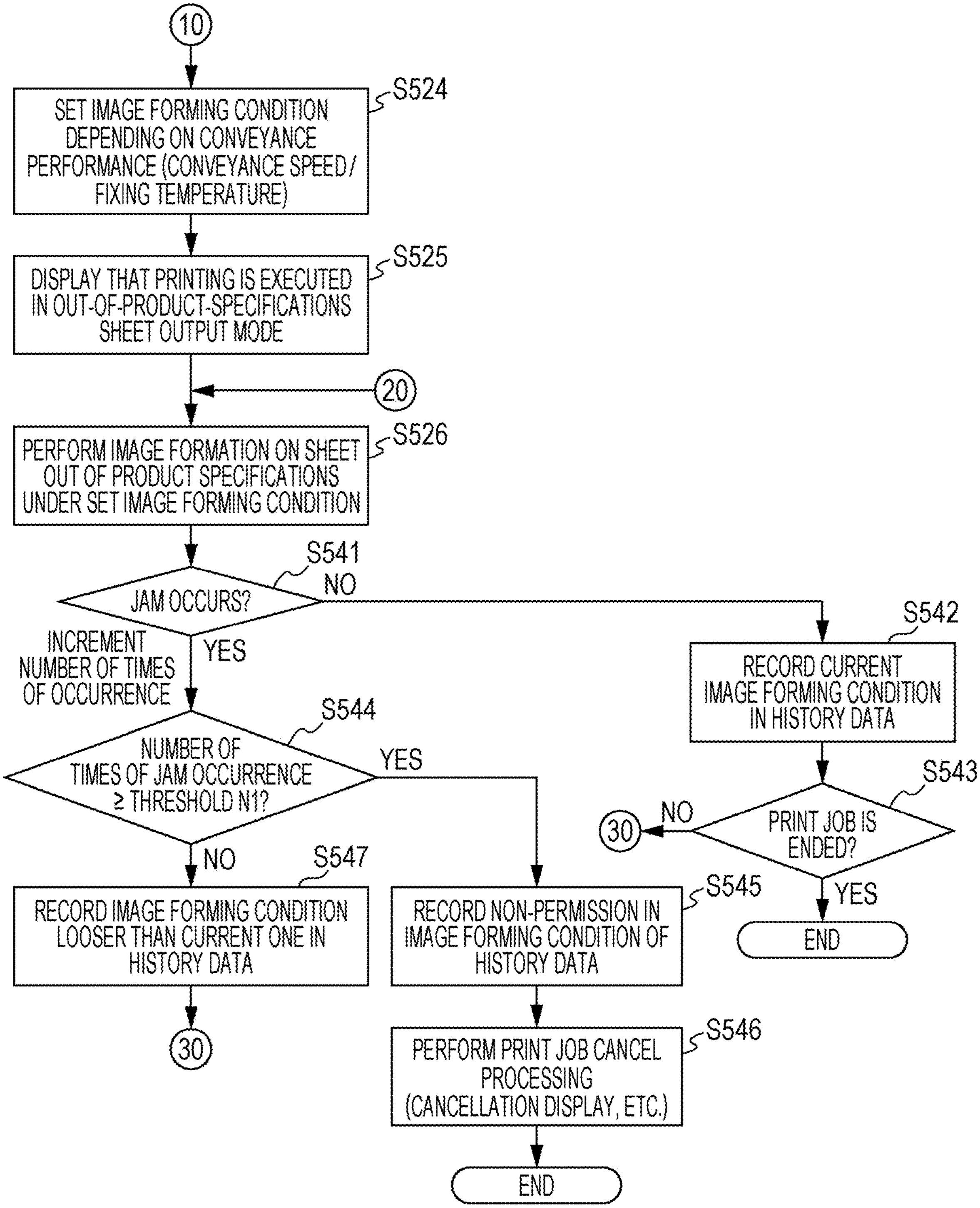

FIGS. 15A and 15B are flowcharts illustrating print processing in the fourth embodiment. The processing of steps S512 to S513 and steps S541 to S546 is different from the flowchart in FIG. 13 in the third embodiment described above. FIGS. 16A and 16B are diagrams for explaining an image forming condition and non-permission information set depending on a jam occurrence history; FIG. 16A illustrates a table indicating history data for each sheet type and the set image forming condition or non-permission information, and FIG. 16B illustrates a table indicating a relationship between the number of times of jam occurrence and the set image forming condition or non-permission information. As illustrated in FIG. 16B, as the number of times of jam occurrence increases, the image forming condition becomes a condition that is looser on the apparatus side as condition 1, condition 2, and condition 3 are satisfied in this order. That is, as condition 1, condition 2, and condition 3 are satisfied in this order, the conveyance speed is reduced or the fixing control temperature is set to a high temperature, so that the margin for the conveyance capability and the fixing capability of the apparatus increases. As a result, setting is performed so that the conveyance performance and the image quality (fixing performance) have margins. Note that, conditions 1, 2, and 3 are the same as those illustrated in FIG. 12C. In addition, in a case where the number of times of jam occurrence is greater than or equal to the predetermined threshold N1, the non-permission information is set. The history data in FIG. 16A indicates each sheet type and the number of times of jam occurrence set by the processing of steps S541 to S547 in FIG. 15B described below, and the image forming condition or non-permission information set depending on the number of times of occurrence.

Steps S501 to S506

The controller 11 (or the sheet type determiner 111) executes the processing of steps S501 to S506, and executes the print processing depending on a set mode or a determined sheet type. These pieces of processing are pieces of processing corresponding to steps S201 to S206 in FIG. 13 (or steps S101 to S106 in FIG. 6) as they are, and the description thereof will be omitted.

Step S511

In step S511, the image formation determiner 113 refers to the history data in the storage 12 as illustrated in FIG. 16A by the processing similar to that of S211 of FIG. 13, and confirms whether data related to the same type of sheet 90 is accumulated.

Step S512

Then, if the same type of data is accumulated (S511: YES) and non-permission is set in the image forming condition of the history data due to the jam occurrence history of greater than or equal to the predetermined threshold N1 (S512: NO), the processing proceeds to step S523 and the print job cancel processing is performed. On the other hand, if the sheet is a sheet that can be output (YES), that is, if non-permission is not set in the image forming condition of the history data (S512: YES), the image formation determiner 113 advances the processing to step S513.

Step S513

The image formation determiner 113 sets the image forming condition read from the history data. For example, in the example of FIG. 16A, in the case of out-of-product-specifications sheet type 01, condition 1 (that is the image forming condition applied to the immediately preceding sheet) is set as the image forming condition. Thereafter, the processing proceeds to step S526, and in step S526, image formation is performed on a sheet out of the product specifications under the image forming condition set in step S513.

Steps S521 to S526

The controller 11 (or the conveyance performance determiner 112, or the image formation determiner 113) executes processing similar to steps S221 to S226 in FIG. 13 (or steps S121 to S126 in FIG. 6). That is, the controller 11 determines whether or not image formation is possible on the basis of the determined conveyance performance, and executes image formation under the image forming condition depending on the conveyance performance set in step S524 or the image forming condition based on the history data set in step S513.

Step S541

Here, the controller 11 executes processing similar to that in step S231 in FIG. 13, and if a jam occurs at the time of image formation on the sheet 90 (YES), increments the number of times of jam occurrence in the history data, and advances the processing to step S544. On the other hand, if the jam does not occur (NO) and the image formation is normally ended, the processing proceeds to step S542.

Step S542

The image formation determiner 113 records the current image forming condition (used in step S526) in the history data of the determined sheet type. This recorded image forming condition is read in step S513 at the time of image formation on the next sheet 90 (using the same sheet type of the same print job), and is used for image formation.

Step S543

If the print job is not ended (NO), the controller 11 returns the processing to step S503 and repeats the subsequent processing. On the other hand, if the print job is ended (YES), the processing is ended.

Step S544

The image formation determiner 113 determines whether or not the number of times of jam occurrence of the history data is greater than the predetermined threshold N1, and if the number of times of jam occurrence is greater than the predetermined threshold N1 (YES), advances the processing to step S545, and if the number of times of jam occurrence is less than the predetermined threshold N1 (NO), advances the processing to step S547.

Steps S545, S546

Here, the image formation determiner 113 records non-permission in the history data, performs the print job cancel processing similar to step S123 in FIG. 6, and ends the processing (end).

Step S547

Here, the image formation determiner 113 records an image forming condition different from the current image forming condition (used in step S526) in the history data of the determined sheet type with an increase in the number of times of jam occurrence. Specifically, in accordance with the table of FIG. 16B, the image forming condition is changed to a condition loosened by one rank. Thereafter, the processing returns to step S503, and the subsequent processing is repeated. In this case, the image forming condition of the history data read in step S513 is applied to image formation on the next sheet 90 of the same print job. This image forming condition is the image forming condition recorded in step S547. Note that, in the fourth embodiment, the history data is reset every time one print job ends so that the history data is applied only in the same print job (for example, reset processing is performed after step S543 (NO)). However, the history data may be continuously used without being reset to be applied across print jobs.

As described above, in the image forming apparatus according to the fourth embodiment, if no jam occurs in a case where image formation is performed on a recording medium of a type out of the product specifications, the image forming condition when the image formation is performed is stored in the history data, and the stored image forming condition is applied when the image formation on the recording medium of the same type is subsequently performed in the same print job; if a jam of the conveyed recording medium occurs in the case where the image formation is performed on the recording medium of the type out of the product specifications, in a case where the cumulative number of times of jam occurrence in the print job is less than a predetermined threshold, an image forming condition different from the image forming condition when the image formation is performed is stored in the history data, and the stored image forming condition is applied when the image formation on the recording medium of the same type is subsequently performed in the same print job, and in a case where the number of times of jam occurrence is greater than or equal to the predetermined threshold, the print job is canceled. In this way, an effect similar to that of the third embodiment can be obtained, and in a case where a jam occurs, a condition under which a jam does not occur can be set by setting a different image forming condition, that is, a different sheet conveyance condition.

The configuration of the image forming apparatus 10 described above is the main configuration described in explaining the features of the embodiment described above, and is not limited to the configuration described above, and may be modified in various ways within the scope of the claims. In addition, the configuration included in the general image forming apparatus 10 is not excluded. Furthermore, the processing in the image forming apparatus 10 according to each of the above-described embodiments may include steps other than the steps illustrated in the above-described flowchart, or may not include some of the steps described above. Furthermore, the order of the steps is not limited to that in the above-described embodiment. Moreover, each step may be combined with another step to be executed as one step, may be included in another step to be executed, or may be divided into a plurality of steps to be executed.

Modification

As a modification, in a case where image formation is performed on a recording medium of a type out of the product specifications, if a jam of the conveyed recording medium does not occur, the image forming apparatus 10 may store an image forming condition at the time of performing the image formation in the history data, and may perform processing to apply the stored image forming condition when the image formation on the recording medium of the same type is subsequently performed in the same print job. Specifically, in the fourth embodiment, the image forming condition is applied to the image forming condition of the next sheet within the same print job (steps S542 to S511 to S512 in FIGS. 15A and 15B); however, not limited to within the same print job, the same image forming condition as before recorded in the history data may be applied to the same type of sheet in the subsequent print jobs without resetting the history data even when the print job ends. As a result, even if the sheet is out of the product specifications, stable image formation can be performed while reducing a jam risk.

In addition, the device and method for performing various types of processing in the image forming apparatus 10 according to the embodiment described above can be implemented by either a dedicated hardware circuit or a programmed computer. The above program may be provided by a computer-readable recording medium, for example, a USB memory, a Digital Versatile Disc ROM (DVD-ROM), or the like, or may be provided online via a network such as the Internet. In this case, the program recorded in the computer-readable recording medium is usually transferred to and stored in a storage such as a hard disk. Furthermore, the above program may be provided as standalone application software or may be incorporated into software of a device as one function of the device.

Although embodiments of the present disclosure have been described and illustrated in detail, the disclosed embodiments are made for purposes of illustration and example only and not limitation. The scope of the present disclosure should be interpreted by terms of the appended claims.

What is claimed is:

1. An image forming apparatus comprising:

a sheet feeding conveyor that feeds and conveys a recording medium to a conveyance path;

an image former that performs image formation on the recording medium conveyed on the conveyance path;

a medium sensor that is disposed on an upstream side in a conveyance direction of the recording medium from the image former on the conveyance path and measures one or more sheet physical properties regarding the recording medium conveyed;

a first hardware processor that determines a type of the recording medium on a basis of the sheet physical properties measured by the medium sensor;

a second hardware processor that determines a sheet arrival delay time, a torque margin, or both for the recording medium conveyed on the conveyance path; and a third hardware processor that determines whether or not to perform the image formation on a basis of whether the sheet arrival time is within a predetermined value, the torque margin is within a predetermined value, or both determined by the second hardware processor in a case where the type of the recording medium determined by the first hardware processor is a type which is out of product specifications when compared to a storage containing known product specifications and one or more image forming conditions corresponding to each product specification.

2. The image forming apparatus according to claim 1, wherein in the case where the type of the recording medium determined by the first hardware processor is the type which is out of the product specifications, the third hardware processor causes the image formation by the image former to be canceled, but in a case where the sheet arrival time, the torque margin, or both determined by the second hardware processor are within predetermined values even when the recording medium is of the type which is out of the product specifications, the third hardware processor does not cause the image formation to be canceled and causes the image formation on the recording medium of the type which is out of the product specifications to be executed.

3. The image forming apparatus according to claim 1, wherein the first hardware processor determines that the recording medium is of the type which is out of the product specifications, on a basis of at least one classifications including a basis weight of the recording medium, whether or not the recording medium is coated, or whether or not the recording medium is an envelope, the classifications being determined by measurement by the medium sensor.

4. The image forming apparatus according to claim 1, wherein the second hardware processor determines whether or not the sheet arrival time is within the predetermined value depending on a conveyance time tx from when the sheet feeding conveyor starts feeding the recording medium to when the recording medium reaches a detection position of a sheet detection sensor disposed at a predetermined position on an upstream side from an image forming position of the image former on the conveyance path.

5. The image forming apparatus according to claim 4, wherein in a case where the recording medium is of the type which is out of the product specifications and the image formation is caused to be canceled, the third hardware processor causes purge processing or jam determination processing to be performed, the purge processing causing the recording medium being conveyed to be discharged to an outside of the image forming apparatus in a state of being a blank sheet, the jam determination processing causing the recording medium being conveyed to be stopped in a middle of the conveyance path, and in a case where the image formation is caused to be executed even when the recording medium is of the type which is out of the product specifications, the third hardware processor sets a conveyance speed, a fixing control temperature, or both of the recording medium as image forming conditions at time of the image formation depending on the sheet arrival delay time, the torque margin, or both determined, and causes the image formation to be executed under the image forming conditions set.

6. The image forming apparatus according to claim 5, wherein the third hardware processor determines a document type to be formed on the recording medium from a color mode, an information of a graphic or text included in print data, or both and the third hardware processor sets the image forming conditions depending on the sheet arrival delay time, the torque margin, or both and further on the document type determined.

7. The image forming apparatus according to claim 5, wherein in a case where the image formation is performed on the recording medium of the type which is out of the product specifications in one print job, the third hardware processor stores the type of the recording medium determined by the first hardware processor as history data in a storage in association with jam occurrence information and image forming conditions of the recording medium conveyed, and when a jam of the recording medium conveyed does not occur in the case where the image formation is performed on the recording medium of the type which is out of the product specifications, the third hardware processor causes image forming conditions at time when the image formation is performed to be stored in the history data, and applies the image forming conditions stored, when the image formation on the recording medium of a same type is subsequently performed in the one print job.

8. The image forming apparatus according to claim 5, wherein in a case where the image formation is performed on the recording medium of the type which is out of the product specifications in one print job, the third hardware processor stores the type of the recording medium determined by the first hardware processor as history data in a storage in association with jam occurrence information and image forming conditions of the recording medium conveyed, and when a jam of the recording medium conveyed does not occur in the case where the image formation is performed on the recording medium of the type which is out of the product specifications, the third hardware processor causes image forming conditions at time when the image formation is performed to be stored in the history data, and applies the image forming conditions stored, when the image formation on the recording medium of a same type is subsequently performed in the one print job, and when a jam of the recording medium conveyed occurs in the case where the image formation is performed on the recording medium of the type which is out of the product specifications, the third hardware processor, in a case where a cumulative number of times of jam occurrence in the print job is less than a predetermined threshold, causes image forming conditions different from the image forming conditions at the time when the image formation is performed to be stored in the history data and applies the image forming conditions stored, when the image formation on the recording medium of the same type is subsequently performed in the one print job, and in a case where the cumulative number of times of jam occurrence is greater than or equal to the predetermined threshold, cancels the print job.

9. The image forming apparatus according to claim 1, wherein the second hardware processor determines whether or not the torque margin is within the predetermined value from a detection result of a drive torque of a drive motor of the sheet feeding conveyor in any section of a section from a position where the sheet feeding conveyor starts feeding the recording medium to a detection position of a sheet detection sensor disposed at a predetermined position on an upstream side from an image forming position of the image former on the conveyance path.

10. The image forming apparatus according to claim 1, wherein in a case where the image formation is performed on the recording medium of the type which is out of the product specifications, jam occurrence information of the recording medium conveyed is stored as history data in a storage in association with the type of the recording medium determined by the first hardware processor, and in a case where there is the history data associated with the type of the recording medium determined by the first hardware processor in the storage, the third hardware processor causes the image formation to be executed in a case where a jam occurrence history is less than a predetermined threshold in the history data, and causes the image formation to be canceled regardless of a determination result by the second hardware processor in a case where the jam occurrence history is greater than or equal to the predetermined threshold.

11. The image forming apparatus according to claim 1, further comprising an operation display that receives an input of a setting from a user and displays various types of information, wherein in the case where the type of the recording medium determined by the first hardware processor is the type which is out of the product specifications, the operation display is caused to display that the recording medium is a recording medium out of the product specifications, and/or execution permission of printing using the recording medium out of the product specifications by a user is received.

12. A non-transitory recording medium storing a computer readable control program for controlling an image forming apparatus including: a conveyance path; an image former that performs image formation on a recording medium conveyed on the conveyance path; and a medium sensor that is disposed on an upstream side in a conveyance direction of the recording medium from the image former on the conveyance path and measures one or more sheet physical properties regarding the recording medium conveyed, the computer readable control program causing a computer to execute processing including:

(a) determining a type of the recording medium on a basis of the sheet physical properties measured by the medium sensor;

(b) determining a sheet arrival delay time, a torque margin, or both for the recording medium conveyed on the conveyance path by a sheet feeding conveyor; and (c) determining whether or not to perform the image formation on a basis of whether the sheet arrival time is within a predetermined value, the torque margin is within a predetermined value, or both determined in the (b) in a case where the type of the recording medium determined in the (a) is a type which is out of product specifications when compared to a storage containing known product specifications and one or more image forming conditions corresponding to each product specification.

13. The non-transitory recording medium storing a computer readable control program according to claim 12, wherein in the (c), the image formation by the image former is caused to be canceled in the case where the type of the recording medium determined in the (a) is the type which is out of the product specifications, but in a case where the sheet arrival time is within a predetermined value, the torque margin is within a predetermined value, or both even when the recording medium is of the type which is out of the product specifications, the image formation is not caused to be canceled and the image formation on the recording medium of the type which is out of the product specifications is caused to be executed.

* * * * *